United States Patent
Williams et al.

(10) Patent No.: US 12,204,906 B2
(45) Date of Patent: Jan. 21, 2025

(54) PROFILING OF SAMPLED OPERATIONS PROCESSED BY PROCESSING CIRCUITRY

(71) Applicant: Arm Limited, Cambridge (GB)

(72) Inventors: Michael John Williams, Cambridge (GB); Alasdair Grant, Cambridge (GB); John Michael Horley, Cambridge (GB)

(73) Assignee: Arm Limited, Cambridge (GB)

( * ) Notice: Subject to any disclaimer, the term of this patent is extended or adjusted under 35 U.S.C. 154(b) by 79 days.

(21) Appl. No.: 17/999,167

(22) PCT Filed: May 20, 2021

(86) PCT No.: PCT/GB2021/051214
§ 371 (c)(1),
(2) Date: Nov. 17, 2022

(87) PCT Pub. No.: WO2021/234387
PCT Pub. Date: Nov. 25, 2021

(65) Prior Publication Data
US 2023/0088780 A1 Mar. 23, 2023

(30) Foreign Application Priority Data
May 22, 2020 (GB) .................................... 2007666

(51) Int. Cl.
*G06F 9/34* (2018.01)
*G06F 9/26* (2006.01)
(Continued)

(52) U.S. Cl.
CPC .............. *G06F 9/342* (2013.01); *G06F 9/261* (2013.01); *G06F 9/3804* (2013.01)

(58) Field of Classification Search
CPC .... G06F 9/3804; G06F 11/3466; G06F 9/342; G06F 9/261; G06F 2201/865;
(Continued)

(56) References Cited

U.S. PATENT DOCUMENTS 10,140,216 B2 11/2018 Williams et al.
2008/0127120 A1* 5/2008 Kosche ............... G06F 11/3447
717/127

(Continued)

FOREIGN PATENT DOCUMENTS

| EP | 0465765 A2 | 1/1992 |
| EP | 0919924 A2 | 6/1999 |
| GB | 2553582 | 3/2018 |

OTHER PUBLICATIONS

Examination Report for GB Application No. 2007666.7 dated Jun. 14, 2022, 5 pages.
(Continued)

*Primary Examiner* — Chun Kuan Lee
(74) *Attorney, Agent, or Firm* — NIXON & VANDERHYE P.C.

(57) ABSTRACT

Processing circuitry performs data processing operations in response to instructions fetched from a cache or memory or micro-operations decoded from the instructions. Sampling circuitry selects a subset of instructions or micro-operations as sampled operations to be profiled. Profiling circuitry captures, in response to processing of an instruction or micro-operation selected as a sampled operation, a sample record specifying an operation type of the sampled operation and information about behaviour of the sampled operation which is directly attributed to the sampled operation. The profiling circuitry can include, in the sample record for a sampled operation corresponding to a given instruction, a reference instruction address indicator indicative of an address of a reference instruction appearing earlier or later (Continued)

in program order than the given instruction, for which control flow is sequential between any instructions occurring between the reference instruction and the given instruction in program order.

23 Claims, 8 Drawing Sheets

(51) Int. Cl.
    *G06F 9/38* (2018.01)
    *G06F 9/50* (2006.01)
    *G06F 11/34* (2006.01)

(58) Field of Classification Search
    CPC ............... G06F 2201/86; G06F 11/348; G06F 11/3419; G06F 2201/88
    USPC .......................................................... 710/20
    See application file for complete search history.

(56) References Cited

U.S. PATENT DOCUMENTS

2016/0283245 A1* 9/2016 Ben-Kiki ............ G06F 12/0895
2017/0371769 A1    12/2017 Merten

OTHER PUBLICATIONS

Arm, "Architecture Reference Manual Supplement Statistical Profiling Extension, for ARMv8-A", 2017 ARM Limited or its affiliates. All rights reserved, Document No. DDI 0586A.

Intel Corporation, "Intel® 64 and IA-32 Architectures Software Developer's Manual vol. 3B: System Programming Guide, Part 2", Order No. 253669-071US, Oct. 2019.

Michael Williams, "Statistical Profiling Extension for ARMv8-A", Jan. 26, 2017.

* cited by examiner

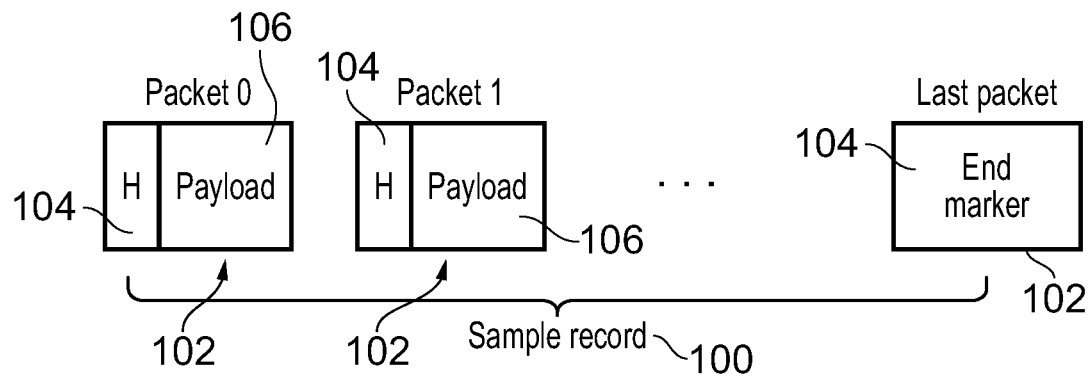

| Packet type | payload |
|---|---|
| Header | profiling source ID |
| Timestamp | system timer value |
| Context | context ID(s) |
| Events | events occurring for sampled operation |
| Counter | count of latency associated with actions taken for sampled operation |
| Operation type | type of operation sampled |
| Address | address associated with sampled operation |
| End marker | end of sample record |
| Padding | No payload |

FIG. 4

| | Byte #0 | +1 | +2 | +3 | +4 | +5 | +6 | +7 |
|---|---|---|---|---|---|---|---|---|
| Byte #0 | Header (16-bit) | Source ID | | Timestamp (64-bit) | Timestamp | | | |
| +8 | Timestamp | | | | Address#1 (64-bit) | Flags | PC | |
| +16 | PC | | | | Context#0 (32-bit) | | CONTEXTIDR_EL1 | |
| +24 | CONTEXTIDR_EL1 | | Context#1 (32-bit) | | CONTEXTIDR_EL2 | | | Prefix |
| +32 | Op type (LD) | Address#2 (64-bit) | | Data address | | | | |
| +40 | Data address | | Counter#1 (16-bit) | | Issue → Addr count | | Counter#2 (16-bit) | Addr → Data count |
| +48 | Events (16-bit) | Event mask | | End-marker | | | | |

FIG. 5

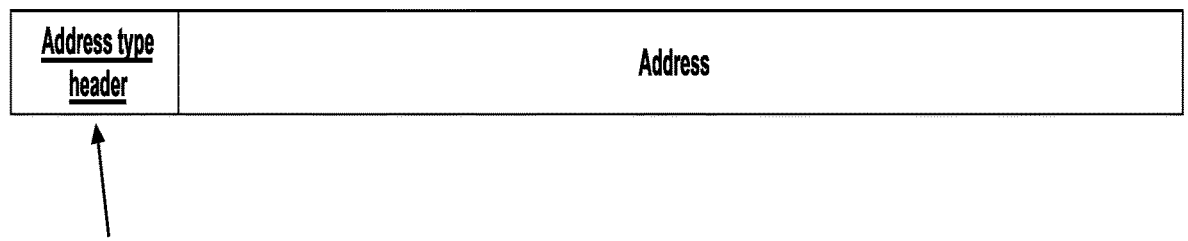

Header (104) encodes which address type is represented by payload, selected from:

- Instruction virtual address
- Data access virtual address
- Branch target address
- Reference instruction address

FIG. 6

Example 1: Reference instruction address tracks earlier instruction, reference instruction is T, not NT, branch Included in sample record for instruction 218:

| Address type: reference instruction address | Address of instruction 202 |
|---|---|

FIG. 8

Example 2: Reference instruction address tracks earlier instruction, reference instruction is either T or NT branch Included in sample record for instruction 218:

| Address type: reference instruction address | Address of instruction 217 |
|---|---|

FIG. 9

Example 3: Reference instruction address tracks later instruction, reference instruction is T, not NT, branch Included in sample record for instruction 218:

| Address type: reference instruction address | Address of instruction 240 |
|---|---|

FIG. 10

Example 4: Reference instruction address tracks later instruction, reference instruction is either T or NT branch Included in sample record for instruction 218:

| Address type: reference instruction address | Address of instruction 234 |
|---|---|

FIG. 11

PROFILING OF SAMPLED OPERATIONS PROCESSED BY PROCESSING CIRCUITRY

The present technique relates to the field of data processing. More particularly, it relates to profiling.

Processing circuitry performs data processing operations in response to instructions fetched from a cache or memory or micro-operations decoded from the instructions. The fetched instructions represent a program written or compiled to carry out operations required by a software developer. To assist with software development, the developer may perform profiling of a program, where information about the behaviour of the program is captured when it is processed by the processing circuitry, so that this information can be analysed to identify parts of the program that may be causing poor performance and possible reasons for poor performance. The results of profiling can be used by software engineers to optimise their software to reduce execution time and allow better utilisation of available resources in the processing system.

At least some examples provide apparatus comprising: processing circuitry to perform data processing operations in response to instructions fetched from a cache or memory or micro-operations decoded from the instructions;

sampling circuitry to select a subset of instructions or micro-operations as sampled operations to be profiled; and profiling circuitry to capture, in response to processing of an instruction or micro-operation selected as a sampled operation by the sampling circuitry, a sample record specifying an operation type of the sampled operation and information about behaviour of the sampled operation which is directly attributed to the sampled operation; in which:

the profiling circuitry is capable of including, in the sample record captured for a sampled operation corresponding to a given instruction, a reference instruction address indicator indicative of an address of a reference instruction appearing earlier or later in program order than the given instruction, for which control flow is sequential between any instructions occurring between the reference instruction and the given instruction in program order.

At least some examples provide a method comprising: performing data processing operations in response to instructions fetched from a cache or memory or micro-operations decoded from the instructions;

selecting a subset of instructions or micro-operations as sampled operations to be profiled; and capturing, in response to processing of an instruction or micro-operation selected as a sampled operation by the sampling circuitry, a sample record specifying an operation type of the sampled operation and information about behaviour of the sampled operation which is directly attributed to the sampled operation; in which:

the profiling circuitry is capable of including, in the sample record captured for a sampled operation corresponding to a given instruction, a reference instruction address indicator indicative of an address of a reference instruction appearing earlier or later in program order than the given instruction, for which control flow is sequential between any instructions occurring between the reference instruction and the given instruction in program order.

BRIEF DESCRIPTION OF THE DRAWINGS

Further aspects, features and advantages of the present technique will be apparent from the following description of examples, which is to be read in conjunction with the accompanying drawings, in which:

FIG. 4 illustrates a number of packet types which could be included in a sample record;

FIG. 5 illustrates an example of a sample record comprising a number of packets;

FIG. 6 illustrates an example of an address packet which may be included in a sample record;

FIGS. 8 to 11 illustrate examples of generating an address packet comprising a reference instruction address for the example sequence of FIG. 7;

DETAILED DESCRIPTION

Figure 1:
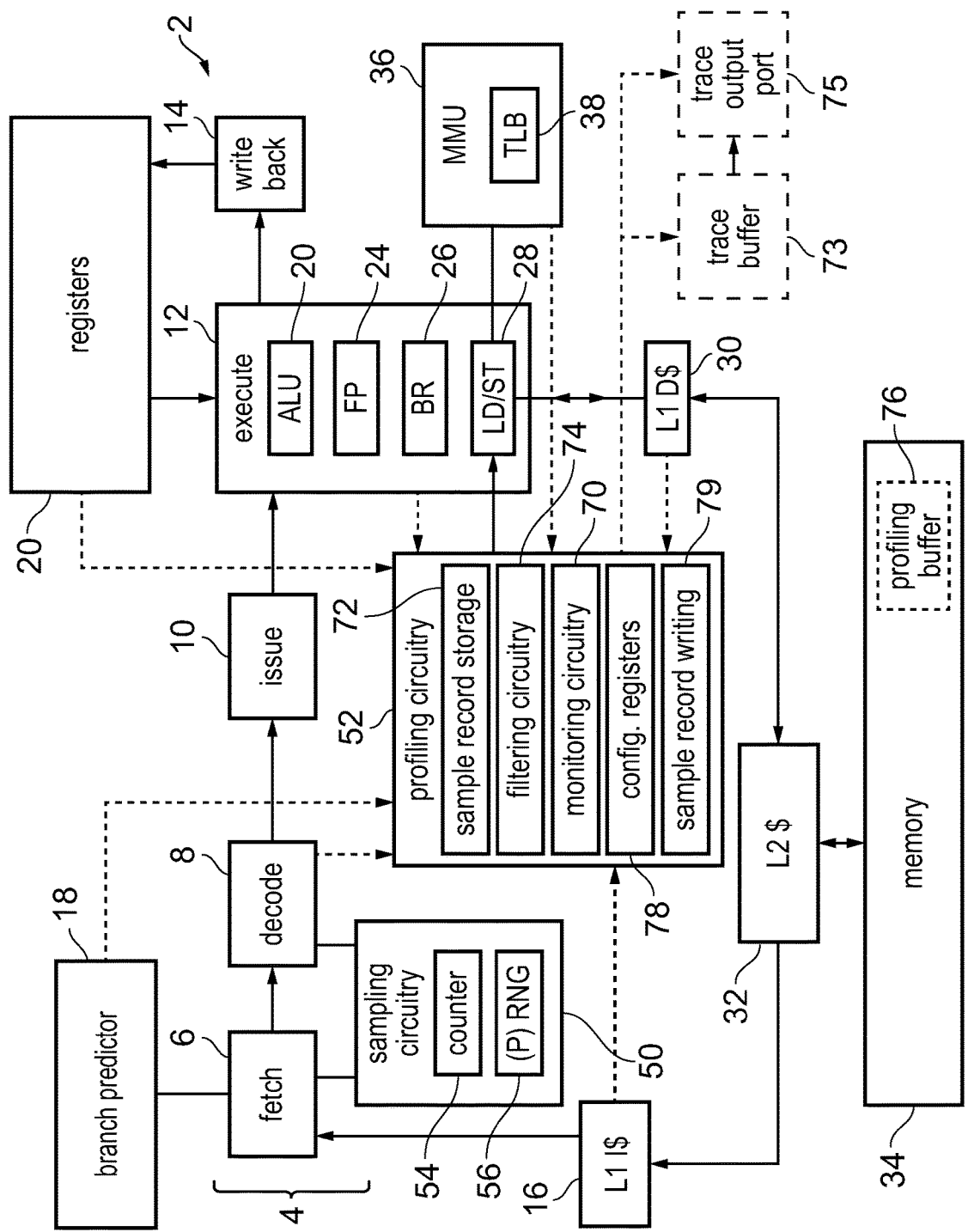
FIG. 1 schematically illustrates an example of a data processing apparatus having profiling circuitry.

A problem encountered in profiling of program execution on a processor is that the processor may be executing millions or billions of operations per second and so it is not feasible to record in detail information about the precise instruction-by-instruction behaviour of every instruction executed. One approach to profiling can be define some performance monitoring counters which count specific events such as cache misses or branch mispredictions which may impact on poor performance, and when a given number of such events have been detected, to generate a performance monitoring interrupt to cause an exception handling routine to read out architectural state from registers or other performance monitoring information, which can then be made accessible for diagnostic analysis. However, a problem with this approach is that it requires interruption of the regular program flow, so to gather information at frequent sampling intervals this requires a high interrupt rate which may impact on the normal running of the program and make the results of the diagnostic analysis less meaningful as the observed behaviour may not be consistent with the behaviour that occurs when not performing profiling. Another issue is that, in practice, there may be a "skid" delay between the time at which the performance monitoring interrupt is signalled and the time at which the exception handler starts to gather the captured architectural state or performance monitoring information, and in the intervening period the processor may have continued to execute hundreds of other instructions so that the information captured cannot be directly attributed to the operation in progress at the point when the interrupt was triggered. Also, with event-driven capture of profiling information, events by themselves do not give very accurate results for location. To optimize code, the engineer may need precise information about where the problem is, such as, for control plane problems, precisely which instruction, line of code, class, and/or module is affected, or the call stack and/or path to that instruction, as flat profiles are often unenlightening; and for data plane problems, an indication of which variable, array or object is affected. This can be difficult to identify with typical event-triggered sampling techniques.

In the examples described below, processing circuitry performs data processing operations in response to instructions fetched from a cache memory or micro-operations decoded from the instructions. Sampling circuitry selects a subset of instructions or micro-operations as sampled operations to be profiled. Profiling circuitry captures, in response to processing of an instruction or a micro-operation selected as a sampled operation by the sampling circuitry, a sample record specifying an operation type of the sampled operation and information about behaviour of the sampled operation which is directly attributed to the sampled operation.

With this approach, as the sample record captures information directly attributed to the sampled operation, this avoids the skid problem which arises with interrupt-based profiling mechanisms as discussed above. The information included in the sample record may directly indicate events that happened during the processing of the sampled operation, such as whether a cache miss in a given level of cache occurred or whether a branch misprediction occurred for a given branch, or may indicate cycle counts measuring latency of certain events during the processing of the sampled operation. Nevertheless, as the sampling circuitry selects only a subset of the instructions or micro-operations as sampled operations this greatly reduces the hardware and power overhead in gathering the information on the sampled operations. The sample records captured for the sampled operations may provide a statistical view of performance of the program as a whole rather than attempting to capture the behaviour of every operation. By indicating the operation type of each sampled operation in the corresponding sample record, it is not necessary to provide any restriction as to what types of sampled operations are selected as the sampled operations by the sampling circuitry so that the sample records are not restricted to capturing the information on a single predetermined type of sampled operation. This can assist with using a single profiling execution run to monitor for two or more different problems in one set of sampling information (rather than using event-triggered sampling where a fixed type of event triggers capture of information). Also, the provision of sampling circuitry to select specific instructions or micro-operations as sampled operations to be profiled can enable events occurring at different stages of the pipeline to be tracked as the sampled operation progresses through the pipeline, which may not be possible in examples where profiling is based on capture of architectural state or performance monitoring counters on occurrence of the specific event, where that information may not be directly attributable to a particular operation but could be based on multiple different operations.

The sampling circuitry and the profiling circuitry can be useful for providing detailed information on the outcomes and performance of particular operations being processed by the processing circuitry, which can be useful for identifying possible reasons for poor performance when executing a given program. However, another aspect of profiling may be to identify which portions of program code are executed more frequently than other portions. The software developer may only have a finite amount of time available for code optimization, and may wish to focus their time on improving performance for the more frequently executed portions of code in preference to less frequently executed sections of code. One might think that with the sampling-based approach to profiling, it would be difficult to analyse the frequency of execution of different sections of code within the program, because the sampling means that many operations are not tracked in the sample records captured for the sampled operations, so that each sample record only provides an indication that a single instruction was executed and would not provide information on how the program reached that instruction and via what path of control flow. Therefore, one might think that the sampling-based approach would require a very large number of samples to be captured to provide meaningful hot-spot profiling information on relative frequency of execution, which might incur too high a cost in terms of the storage and data output overhead of generating such a high volume of sampling information.

In the examples described below, the profiling circuitry is capable of including, in the sampled record captured for a sample operation corresponding to a given instruction, a reference instruction address indicator indicative of an address of a reference instruction appearing earlier or later in program order than the given instruction, for which control flow is sequential between any instructions occurring between the reference instruction and the given instruction. The profiling circuitry may be prohibited from setting the reference instruction address indicator to an address of an instruction for which there was a non-sequential change of control flow between any two instructions occurring between the reference instruction and the given instruction (the given instruction may be a taken branch instruction, so this does not prevent there being a non-sequential change of control flow between the given instruction and the immediately following instruction—in that case the reference instruction address could still indicate the address of a later instruction than the given instruction, as long as there are no subsequent non-sequential changes of control flow after the branch taken by the given instruction).

Hence, by including in the sample record for a given sampled operation, an indication of an address of an instruction for which control flow was sequential up to, or following, the given instruction, this allows a single sample record to provide evidence that a whole range of instruction addresses were executed, greatly reducing the number of sample records that need to be captured to provide sufficient information to generate a statistically meaningful hot-spot profile indicating relative frequency of executing different parts of the program. This reduces the volume of profiling data needed compared to a sample-based profiling approach which does not support use of the reference instruction address indicator. Hence, program optimisation by a software developer can be more efficient. However, unlike alternative trace-based techniques for generating program flow profiles which capture only the information about the path of control flow taken but do not indicate any other information, the sample records captured may also indicate other non-control-flow information, such as events or cycle counts, which can enable a single diagnostic execution run to gather profiling information for multiple purposes.

In some examples the profiling circuitry may be capable of setting the reference instruction address indicator to indicate an address of an earlier instruction which appears earlier in program order than the given instruction, for which control flow is sequential from the earlier instruction to the given instruction. This approach may be simpler to implement in terms of the hardware circuit logic provided for tracking the reference instruction address. For example a storage element may be provided which can be reset when an instruction is identified which represents one of a number of types of events which could be used to mark the reference instruction, and used to track either the address of the instruction at the reset point or count a number of instructions seen since the reset point. When a subsequent sampled operation is encountered, the value tracked in that storage element can then be used to set the reference instruction address indicator in the sample record for the sampled operation.

However, other examples may provide profiling circuitry which is capable of setting the reference instruction address indicator to indicate an address of a later instruction appearing later in program order than the given instruction, for which control flow is sequential from a next instruction after the given instruction to the later instruction. With this approach the reference instruction address indicator effectively gives a view of how far beyond the given instruction the next sequential block of control flow continued before reaching a non-sequential change of control flow or other event requiring tracking of the reference instruction address to halt.

Some embodiments may support both of these options, where the reference instruction address indicator could provide an indication of either the address of an earlier instruction or an address of a later instruction (e.g. selecting the one that indicates the longest run of sequential execution to provide the greatest possible number of "instruction execution counts" for a hot-spot profile), or could indicate both types of reference instruction address indicator in the same sample record to provide even more information about control flow both before and after the given instruction corresponding to the sampled operation. However, in many embodiments it may be sufficient to track control flow only in one direction relative to the given instruction (only looking back to earlier instructions in program order, or only looking forward to later instructions in program order), to limit the hardware cost of the tracking of the reference instruction address.

The profiling circuitry may be capable of setting the reference instruction address indicator to indicate a branch target address of a most recent taken branch instruction prior to the given instruction, or to indicate an instruction address of a next taken branch instruction after the given instruction. Since taken branch instructions represent the points at which there is a non-sequential change of control flow, then using the reference instruction address indicator to give an indication of the most recent or next taken branch may give maximum amount of information about the size of the sequential run of instructions executed before or after the given instruction, giving a larger number of "instruction execution counts" that can contribute towards a hot-spot profile. Hence, if looking back to earlier instructions prior to the given instruction, the referenced instruction could be the instruction at the branch target address of the most recent taken branch instruction, while if the reference instruction address indicator is being used to look ahead to later instructions in program order after the given instruction then the referenced instruction could be the next taken branch instruction after the given instruction itself.

However, in practice the inventors recognised that although using the reference instruction address indicator to indicate a position of the most recent or next taken branch can enable a larger block of sequentially processed instructions to be indicated, in some (but not all) profiling scenarios an approach of always using the taken branch position to set the reference instruction address indicator can give biased outcomes of hot-spot profiling. Hence, it can be useful to provide profiling circuitry which also supports the capability to set the reference instruction address indicator to indicate the instruction address of an instruction other than any of the following: an instruction at a branch target address of a most recent taken branch instruction prior to the given instruction, and an instruction address of a next taken branch instruction after the given instruction. More particularly, it can sometimes be useful to be able to set the reference instruction indicator to indicate an instruction address of one of: an instruction to which program flow is directed after a most recent branch instruction prior to the given instruction, regardless of whether the most recent branch instruction was taken or not taken; or an instruction address of a next branch instruction after the given instruction, regardless of whether the next branch instruction is taken or not taken.

It may be seen as counter-intuitive that one would want to use the reference instruction address indicator to indicate a location of a previous/next not-taken branch instruction, as there would be other instructions sequentially executed before or after the not-taken branch, so this approach appears to give up the opportunity of increasing the range of instructions which can be confirmed as having been executed by the contents of a single sample record. However, as explained in more detail below, if sample records for both taken and not-taken branches record the reference instruction address indicator with reference to taken branches only, and the resulting reference instruction address indicators are used for hot-spot profiling, this can lead to the resulting hot-spot profiling incorrectly indicating that a section of code on one side of a consistently not-taken branch was executed more frequently than another section of code on the other side of the consistently not-taken branch, even if both sections of code were executed an equal number of times. This problem of skewed profiling results can be prevented by using the location of a previous branch or next branch to set the reference instruction address indicator, regardless of whether that branch was taken or not taken. For some profiling scenarios, this can give a more accurate indicate of the relative frequencies with which particular sets of instructions were executed.

However, there are other profiling scenarios when this problem does not arise (e.g. if samples for not-taken branches are not output for analysis), and in that case it may be preferred to use an earlier/later taken branch as the reference for generating the reference instruction address indicator.

In this application, unless otherwise stated, terms which define a relative ordering of instructions (such as "earlier", "later", "next", "most recent", "before", "prior to" or "after") refer to the order in which the instructions appear in program order. Program order refers to the order in which instructions would be executed in an in-order processor. In other words, the program order corresponds to the order defined by the programmer or compiler that created the program. A fetch stage of the processing circuitry may fetch instructions for execution in program order. Some implementations may use in-order processing circuitry, which also executes the instructions or micro-operations in an order corresponding to the program order. However, in other examples, the processing circuitry may out-of-order processing circuitry which is capable of reordering the instructions/micro-operations so that the instructions or micro-operations are allowed to be processed in an order which differs from program order. For example, if an earlier instruction in program order is stalled while waiting for operands to become available, a later instruction in program order may be executed before the earlier instruction. Hence, for the purposes of tracking the reference instruction address indicator, the terms referring to a relative order between instructions refer to the program order. This does not exclude the processing circuitry executing the instructions in a different order. For example, a most recent branch in program order may in some cases be actually executed after an earlier branch in program order, depending on timings at which operands become available and dependencies between instructions.

One way of selecting which address to indicate as the reference instruction address can be to define certain types of reference instruction address reset events which indicate that an address associated with the reference instruction address reset event should be recorded as the reference instruction address for a later or earlier sampled operation. In an example where the sample record specifies an address of an earlier instruction than the given instruction as the reference address, the reference instruction address indicator may be set to the address associated with a most recent reference instruction address reset event occurring prior to the given instruction. In an example where the sample record specifies an address of a later instruction than the given instruction as the reference address, the reference instruction address indicator may be set to the address associated with the next reference instruction address reset event occurring after the given instruction.

As mentioned above, the positions of the most recent or next taken branch instruction in program order relative to the given instruction may generally represent the maximum range before or after the given instruction which would be allowed to be identified using the reference instruction address indicator. Hence, it may be useful for the profiling circuitry to detect, as the reference instruction address reset event, the processing of a taken branch.

However, there may be one or more other types of reset event which may reset the tracking of the reference instruction address so that if a reference instruction address reset event occurs between the taken branch instruction and the given instruction then instead the reference instruction address indicator may be set to mark the location of an instruction corresponding to the point where the reset event occurred.

For example, the processing of a not-taken branch operation may also be detected as the reference instruction address reset event, so if there is a not-taken branch between the given instruction and the most recent/next taken branch, the reference instruction address may instead point to an address associated with the not-taken branch operation. By supporting the option to refer to the address of a not-taken branch (or the address of the instruction following a not-taken branch) as the reference instruction, this can help to improve the statistical validity of the hot-spot profiling results, so that hot-spot profiling measurements derived from a set of sample records by hot-spot profiling are representative of the actual relative frequencies of execution of different blocks of instructions. A more detailed explanation for why using a not-taken branch as such a reset event avoids statistical bias is provided below with respect to FIG. 7.

In some implementations, processing of a not-taken branch could always be treated as a reference instruction address reset event.

However, other implementations may provide configuration information (e.g. stored in a configuration register) which is configurable by software or by an external device, to define whether the processing of the not-taken branch operation should be detected as the reference instruction address reset event. The profiling circuitry can determine whether the not-taken branch should be detected as the reference instruction address reset event based on the configuration information. For some forms of analysis (e.g. when not-taken sample records will be discarded before output or output but not used in the analysis), indicating the reference instruction address indicators relative to taken branches only may be acceptable, so by configuring the profiling circuitry so that not-taken branches are not treated as a reference instruction address reset event, this may allow the reference instruction address indicators to indicate a larger range of sequentially executed instructions extending past the not-taken branch to a taken branch, so as to give more instruction counts that can be used for hot-spot profiling. In contrast, if an analysis is to be performed where there is a risk of skewing the profiling results unless the reference address tracking references the not-taken branches, then the configuration information can be set to indicate that not-taken branches should be detected as a reference instruction address reset event. By providing the configuration information to control whether not-taken branches are treated as the reset event or not, this gives the flexibility to vary the approach taken to suit the type of analysis being performed.

In some examples, the apparatus may have filtering circuitry which controls, based on whether the sampled operation satisfies at least one filter criterion, whether the sample record captured for the sampled operation by the profiling circuitry is made available for diagnostic analysis. Not all sample records captured by the profiling circuitry may be relevant to the purpose for which the profiling is being performed and so the filtering circuitry may be configurable to ensure that only certain types of sample records become available for diagnostic analysis, to conserve capacity or bandwidth of resources for storing and outputting the sample records. For example, sample records could be made available for diagnostic analysis in different ways, for example by writing a sample record to memory (from which the sample record may be readable by other software executed on the processing system being debugged), by outputting the sample record to an on-chip trace buffer on-chip and/or by outputting the sample record over a trace port to an external device which stores the sample record or performs diagnostic analysis using the sample record. Some systems may support more than one of these forms of making the sample record available for diagnostic analysis. Regardless of which form is supported, by providing filtering based on at least one filter criterion (which may be configurable by the user by adjusting filter configuration data stored in configuration registers associated with the profiling circuitry) this can allow the software developer to control what types of sample records are captured.

In one example, the configuration information used to determine whether not-taken branches should be treated as the reset event could be filter criteria configuration information which also controls one or more filter criteria for the filtering circuitry. For example, the configuration information could be seen by the user as defining the filter criteria, but for certain settings of the filter criteria the profiling circuitry may treat the non-taken branches as a reset event while for other settings of the filter criteria the non-taken branches may not be treated as a reset event. For example, if the filter criteria are set so that a sample record for a not-taken branch operation is allowed to be made available for diagnostic analysis, and the reference instruction address indicator is to be included in a sample record captured for a not-taken branch operation, then the profiling circuitry may detect as the reference instruction address reset event the processing of a not-taken branch operation (regardless of whether that not-taken branch operation was itself selected as a sampled operation). If the filter criteria are set to indicate that a sample record for a not-taken branch operation is not to be made available for diagnostic analysis, or if a sample record for a not-taken branch operation will not include the reference instruction address indicator, then there is no need to treat the processing of a not-taken branch operation as a reset event.

However, in other examples, the configuration information for determining whether to treat a not-taken branch as a reset event could be defined separately from any configuration information setting the filter criteria for the filtering circuitry. In this case, there may be orthogonal controls for the types of reset events to be detected as resetting the reference instruction address tracking, and the filter criteria to be used by the filter. It may be left up to the user (or the software implementing the profiling analysis) to determine which combinations of reset event/filter settings are the settings to be used for the type of analysis they wish to perform, when considering the risk of biased analysis results.

Other types of reference instruction address reset events may include:
- enabling of profiling by the profiling circuitry after profiling was previously disabled. If profiling was disabled for a time, then any previously occurring taken branch may not have been tracked, so the reference point for the reference instruction address may be the point at which profiling is enabled.
- taking an exception, and/or returning from exception. This recognises that during processing of an exception handler which interrupts the processing of the program being profiled, it is possible that instructions within the exception handler could cause some of the tracking resources of the profiling circuitry to change state including any tracking resources used to track the reference instruction address indicator and so on return from the exception the tracking of a previous taken branch may no longer be reliable. Therefore to provide a valid profiling result, it may be preferred to reset the tracking of the reference instruction address on an exception being taken or on an exception return.
- Also, sometimes the processing of a sampled operation could itself be treated as a reference instruction address reset event. For example, when the sampled operation is a taken/not-taken branch, as well as capturing a reference instruction address indicator in the sample record indicating an address of a later/earlier reference instruction than the sampled branch instruction, the address of the sampled branch instruction itself (or the next instruction after the sampled branch) may be recorded for use as the reference address for another sampled operation.

Not all implementations need to support all of these types of reset event. Also, some implementations could support configuration information defining what types of events cause reset (at least for some forms of reset event). Also, for some types of reset event (e.g. the processing of a sampled operation), although sometimes that event may cause a reset, on other occasions the event may not cause a reset (e.g. whether the event is a reset event may also depend on other conditions).

An alternative to resetting the tracking of a reference instruction address in response to the other types of reset event discussed above (enabling of profiling, taking/returning from an exception, processing of a sampled operation) can be that instead the tracking of the reference instruction address could be invalidated when such events occur. In this case, the reference instruction address indicator may either be valid and indicate a location of a taken or not taken branch (or the instruction following the taken or not taken branch), or be invalidated if one of the invalidation events occur which indicate the reference address indicator may be unreliable (such as when the enabling of profiling or the exception taken/return events occur). Also, to simplify micro-architectural implementation of the capture of the information within a sample record, it can be useful (although not essential) to treat processing of a sampled operation itself as a reference instruction address invalidation event, because a sampled operation may often be of the same type as one of the types of instructions that can be detected as the reference instruction (e.g. the sampled operation could itself be a taken/not-taken branch), so the sampled operation might itself cause a reset of the reference instruction address as discussed above. Hence, it may be desirable to ensure that any previously set reference instruction address is captured for the sample record to be output for the sampled operation before the reference instruction address is reset in response to the sampled operation itself, but this can create a challenge in managing the timings of the capture/reset. One way of preventing the previously tracked address being overwritten before it has been captured in the sample record may be to suppress the sampled operation itself serving as a reference instruction because it is sampled, and so leave the reference instruction address unchanged in response to the sampled operation. Given that the sampling interval is generally expected to be significantly larger than the interval between successive reference instruction address reset events (e.g. branches), it is very unlikely that the reference instruction address would not be reset before the next sampled operation is encountered, but to be sure (and avoid a risk of a subsequent sampled operation potentially referencing a reference address for which there was an intervening non-sequential change of program flow), the reference instruction address can be invalidated in response to a sampled operation, after it has been transferred to the sample record for the sampled operation.

Note that while the profiling circuitry is capable of indicating addresses of earlier or later instructions in program order than the given instruction in the reference instruction address indicator stored in the sample record for the given instruction, in some scenarios it may be possible that the reference instruction address indicator ends up indicating the address of the given instruction itself. For example, in the example where the reference instruction address indicator is set to indicate the branch target address of a taken/not-taken branch instruction, then if the sampling circuitry selects, as the sampled operation, the instruction at the branch target address of a taken branch or the instruction following the not-taken branch sequentially, then the reference instruction address indicator would indicate the address of the given instruction itself. Therefore, while the profiling circuitry is capable of encoding the reference instruction address indicator such that it indicates an address of an earlier or later instruction in program order than the given instruction, this does not exclude that sometimes the profiling circuitry may use the reference instruction address indicator to indicate the address of the given instruction itself.

In some implementations the profiling circuitry may be capable of including the reference instruction address indicator in the sample record captured for any type of sampled operation, regardless of the type of instruction that corresponds to the sampled operation.

However, in practice, to avoid the statistical bias of the type discussed above, it may be desirable that the reference points for the reference address tracking are selected from the same population of operation types as the population of operation types for which sample records will provide the reference instruction address indicator. Therefore, if any operation type was allowed to provide a sample record including the reference instruction address indicator, then while a larger number of samples would be able to be counted towards the hot spot profiling, in practice to ensure statistically unbiased results, it may be needed for the reference instruction address indicator to use as a reference the position of the most recently/next processed instruction of any operation type, which limits the range of earlier/later instructions which can be indicated by the reference instruction address indicator in a single sample.

Hence, to increase the range of instructions which can be indicated as executed by the reference instruction address indicator in one sample record while achieving unbiased profiling results, it may be preferable to restrict the reference instruction address indicator to be included only in the sample record for a certain subset of types of instruction, so that it becomes possible for the reference instruction address indicator to look further ahead/behind the given instruction in program order without skewing the profiling results.

In one example, the reference instruction address indicator may be included in the sample record captured from the sample operation corresponding to the given instruction, at least when the given instruction is a taken or not-taken branch instruction. Some examples may only include the reference instruction address indicator for taken branch instructions, but not for not-taken branch instructions. Other examples may support tracking the reference instruction address indicator in the sample records for both taken and not taken branch instruction (and in this case, it may be desirable for the processing of a sampled or unsampled not-taken branch operation to reset the tracking of the reference instruction address as discussed above). Which types of instructions have the reference instruction address indicator indicated if the instruction is chosen as the sampled operation can be fixed in hardware, or could be variable so that the user can configure (e.g. by setting configuration information in a configuration register) which types of instruction should have their sample records including the reference instruction address indicator.

Such configuration information could also control whether the reference instruction address indicator should be included any sample records at all (for any types of operation). Hence, it is not essential for the profiling circuitry to always operate so that reference instruction address indicators are included in sample records. The profiling circuitry may omit the reference instruction address indicator when profiling configuration information specifies that capture of the reference instruction address indicator is disabled. When the profiling configuration information specifies that capture of the reference instruction address indicator is enabled, the reference instruction address indicator could be included (but could also be omitted for other reasons, e.g. because a reference instruction address invalidation event had occurred as described above). Hence the user can select whether or not the reference instruction address indicator is of interest to trade off the ability to perform hot-spot profiling against conservation of diagnostic storage/bandwidth.

In some examples, the sample records may have a packetized format where the sample record may comprise one or more packets. The number of packets in one sample record could be fixed or could be variable depending upon the implementation. By providing a packetized format this gives the flexibility for different microarchitecture designers to select different formats as appropriate, while still complying with a certain architectural definition of the packets so that software can interpret the packet in a consistent manner regardless of the specific format of the sample record used for a particular implementation. Different types of packets may be defined to indicate different types of information that may be recorded within the sample record. One of these types of packets may be an address packet which specifies an address associated with the sampled operation. The address packet may have a packet header which identifies that the packet is an address packet (distinguishing from other types of packet not providing an address), but which may also specify what type of address is associated with the sampled operation. This could be done in different ways, for example having a first header portion identifying that packet as an addressed packet and a second portion which serves as the address type indicator, or by having a single combined header value which both identifies that the packet is an address packet and also serves as the address type indicator (in this example multiple different values of the packet header corresponding to different address type indicators may all be treated as headers of address packets).

The address type indicator for an address packet may have a number of valid encodings, including a reference instruction address encoding indicating that the corresponding address packet specifies the reference instruction address indicator and at least one other encoding indicating that the address packet specifies an address other than the reference instruction address indicator. By assigning a dedicated encoding of the address type indicator for identifying that the address packets specify the reference instruction address, this enables the diagnostic analysis tool to extract reference instruction addresses from various sampled records and use these for profiling.

As mentioned above, sample records captured by the profiling circuitry may be made available for diagnostic analysis. In one example the sample record may be made available by writing the sample records to memory using sample record writing circuitry. The sample record writing circuitry may be capable of writing the sample records captured by the profiling circuitry to memory while the processing circuitry continues with uninterrupted processing. Hence, unlike the interrupt-based approach discussed earlier, the sample record may initially be captured in hardware storage elements of the profiling circuitry, and then written out to the memory which is generally accessible by load/store instructions executed on the processing circuitry, without needing specific store instructions to be executed in software by the processing circuitry to cause the sample record to be saved to memory. This greatly reduces the impact of profiling on the performance of the code executing on the processing circuitry and avoids interrupts for performance monitoring purposes leading to artefacts in the gathered profiling information. For example a buffer structure may be maintained in memory of a certain size sufficient to store a certain number of sample records, and an interrupt would only need to be triggered once the buffer in memory is at risk of overflow, rather than being generated each time a sample record is generated.

Filtering circuitry may be provided to determine, based on whether the sampled operation satisfies at least one filter criterion, whether the sample record writing circuitry should write to memory the sample record captured by the profiling circuitry for the sampled operation. Filter criteria could be based on the type of sampled operation, or based on information within the sample record itself. For example, filter criteria could specify that only sample records for mispredicted branches should be written to memory, but it is not necessary to write to memory sample records captured for correctly predicted branches, if the software developer is interested in probing reasons for mispredictions for example. Alternatively, the filter criteria could be based on whether there is a miss in a certain level of cache for a load operation, or on whether the instruction address of the sampled operation is in a given range of addresses, etc. A wide range of filter criteria may be supported by the filtering circuitry.

One option for the filter criterion can be a criterion that the sampled operation corresponding to the given sample record is a taken branch operation. This can be useful for hotspot profiling since. By only recording sample records for taken branches which represent the points of non-sequential program flow, this allows it to be safe to use the reference instruction address indicator to reference the branch target address of the most recent taken branch or the instruction address of the next taken branch (without skewing the hot-spot profiling results), so that the maximum possible range of earlier/later instructions can be indicated as executed in each sample, enabling the greatest possible amount of hotspot profiling for a given number of sample records. However, only tracking the taken branches may not allow other forms of performance analysis to be performed on the same set of sample records in addition to hotspot profiling.

In another example, the filtering circuitry may be configurable to specify as one of the at least one filter criterion a criterion that the sampled operation corresponding to the given sample record is either a taken branch operation or a not-taken branch operation. By providing the ability to ensure that sample records for both taken and not-taken branch operations are saved off to memory or otherwise made available for diagnostic analysis, while excluding other sample records relating to operations which are neither a taken branch nor a not-taken branch, this can allow the hotspot profiling to be performed using the reference instruction address indicator included in the sample records for taken/not-taken branches, while also supporting other types of performance analysis based on the same execution run (e.g. analysing poor performance caused by mispredicted branches, which can be more reliable if both taken and not-taken branches are included in the sample records output for diagnostic analysis). Hence, a set of sample records captured for a single instance of executing the program can be used for both purposes (rather than needing to carry out two separate execution runs, one tracking the taken branches for hotspot profiling and another tracking mispredicted branches). When the filter is configured to output samples for both taken and not-taken branches, then if the reference instruction address indicator is being included in both taken and not-taken branch events it is desirable for the reference instruction address tracking to be relative to either taken or not-taken branches to avoid systematic skew of the hot-spot profiling for the reasons given above.

The sampling of operations by the sampling circuitry may be controlled in different ways. For example the sampling circuitry could select instructions at the fetch stage or decode stage of a processing pipeline, or at a later pipeline stage. However, by selecting sampled operations at a relatively early stage of the pipeline (such as fetch or decode), it becomes possible to track events associated with those sampled operations through the lifetime of processing of the operation in subsequent stages.

The sampling circuitry may select a next sampled operation in response to elapse of a sampling interval counted by an interval counter. The interval counter may count different forms of operations to determine when next to select a sampled operation. For example, the interval could be counted based on the number of instructions fetched from the cache or memory, the number of instructions decoded by an instruction decoder, or the number of micro-operations generated by the decoder for execution.

The sampling circuitry may support random perturbation of the sampling interval, so that if random perturbation of the sampling interval is enabled, the profiling circuitry may adjust the sampling interval by a random or pseudorandom value, to set the sampling interval counted by the interval counter in a given period. For example, the sampling interval may be configurable by a user (by setting control data in a register) to specify a nominal number of instructions or micro-operations to count between two successive sampled operations, but this nominal value may be adjusted by the random/pseudorandom value to vary the exact interval in one period of counting compared to the next. This reduces the risk that the sampling circuitry may repeatedly select the same operation within a program loop on multiple iterations through the loop, which could risk skewing profiling results.

The reference instruction address indicator can be represented in a number of ways. In general, the reference instruction address indicator can be any value which enables the address of the referenced instruction to be identified. In one example, the reference instruction address indicator could be an absolute value of the address of the reference instruction. Another example could be that the reference instruction address indicator specifies a relative offset of an address of one of the given instruction and the reference instruction relative to the address of the other. This approach can help to compress the amount of data needed in the sample record, as the relative offset can typically be expressed using fewer bits than the absolute value of the address of the reference instruction. In another example, the reference instruction address indicator could indicate a number of instructions between the given instruction and the reference instruction in program order.

FIG. 1 schematically illustrates an example of a data processing apparatus 2 comprising processing circuitry 4 for performing data processing. The processing circuitry 4 comprises a processing pipeline having a number of pipeline stages, including a fetch of data 6, a decode stage 8, an issue stage 10, an execute stage 12 and a writeback stage 14 in this example. It will be appreciated that this is just one example of possible pipelined configuration and other examples may have a different number of stages and may include additional types of pipeline stage.

The fetch stage 6 fetches instructions from a level 1 instruction cache 16 for execution by the pipeline. A branch predictor 18 provides predictions of outcomes of branch instructions which can be used by the fetch stage 6 to decide which instructions to fetch beyond a branch. Instructions fetched by the fetch stage 6 are decoded by the decode stage 8 to generate control signals for controlling later pipeline stages to perform the operations represented by the instructions. The decode stage 8 may map the instructions to micro-operations which represent operations to be performed at a granularity at which the execute stage 12 can execute them.

In some pipeline implementations, there is always a one-to-one mapping between the instructions fetched from memory and micro-operations as seen at later stages so the micro-operations can simply be seen as equivalent to, or a representation of, the originally fetched instructions themselves (although it is still possible for the micro-operations to be represented in a different form the corresponding instructions—e.g. a micro-operation could be tagged with additional information, such as the "sampled operation" tag described below). Such a pipeline implementation may either be viewed as executing instructions directly (without decoding instructions to micro-operations, as there is no change of mapping) or could be viewed as executing micro-operations, which are decoded from instructions with a one-to-one mapping. Both views can be seen as equivalent descriptions of the same pipeline.

In other examples, for at least some instructions the pipeline may support one-to-many or many-to-one mappings of instructions to micro-operations. Some instructions may still correspond to a single micro-operation. Other instructions may be split into multiple micro-operations by the decode stage 8. The decode stage 8 could also support fusion of two or more program instructions fetched from the cache 16 to form a single combined micro-operation supported by the execute stage 12. Hence, the micro-operations seen by the execute stage 12 may differ from the architectural definition of the instructions defined in an instruction set architecture supported by the data processing apparatus 2.

In the description below, the term "micro-operation" refers to the form of the instruction as seen at the execute stage. This could simply be the original instructions themselves for some pipelines, or could be a modified form of the instruction or a micro-operation obtained by splitting one instruction into multiple micro-operations or fusing multiple instructions into a combined micro-operation.

The issue stage 10 queues micro-operations generated by the decoder 8 while awaiting for operands to become available and issues a micro-operation for execution when its operands are available (or when it is known that an operand will become available by the time the micro-operation reaches the relevant cycle of the execute stage at which the operand is needed). The execute stage 12 includes a number of execution units 22-28 for executing different types of micro-operation. Processing operations are performed by the execution units 22-28 based on operands read from registers 20. For example, the execution units of the execute stage 12 may include an arithmetic/logic unit (ALU) 22 for performing arithmetic or logical operations, a floating-point unit 24 for performing operations involving numbers represented as floating-point values, a branch unit 26 for determining whether branch instructions should be taken or not taken and for adjusting program flow to perform a non-sequential change of program flow when a branch is taken, and a load/store unit 28 for processing load operations to load data from a memory system to the registers 20 and store operations to store data from the registers 20 to the memory system. It will be appreciated that the particular set of execution units 22-28 shown in the execute stage 12 in the example of FIG. 1 is just one possible arrangement, and other examples may have different types of execute unit or could have multiple execute units of the same type (e.g. multiple ALUs 22). The write back stage 14 writes results of executed micro-operations to the registers 20.

The processing pipeline 4 could be an in-order processing pipeline, which is restricted to executing the micro-operations in an order corresponding to the program order in which the instructions are defined by the programmer or compiler and in which the instructions are fetched by the fetch stage 6. Alternatively, the processing pipeline 4 could support out-of-order processing, where the issue stage 10 is allowed to issue micro-operations for execution in an order which may differ from the program order. For example, while one micro-operation is stalled awaiting its operands to become available, a later micro-operation associated with a later instruction in program order may be executed ahead of the stalled instruction. If the pipeline supports out-of-order processing then additional pipeline stages could be provided, such as a rename stage to remap architectural register specifiers specified by decoded program instructions to physical register specifiers identifying particular hardware registers in the register bank 20.

In this example, the memory system includes the level 1 instruction cache 16, a level 1 data cache 30, a shared level 2 cache 32 which can be used for both data and instructions, and main memory 34, which may include a number of memory storage units, peripheral devices and other devices accessible via load/store instructions executed by the pipeline 4. It will be appreciated that the particular cache hierarchy shown in FIG. 1 is just one example and other examples may have a different number of cache levels or could provide a different arrangement of the instruction cache is relative to the data caches (e.g. the level 2 cache 32 could be split into separate level 2 instruction and data caches). A memory management unit 36 is provided for controlling address translation between virtual addresses (generated based on operands of instructions processed by the processing pipeline 4) to physical addresses identifying locations to be accessed in the memory system. The MMU 36 may include at least one translation lookaside buffer (TLB) 38 for caching information dependent on page table data obtained from the memory system 34 which defines address translation mappings and may also provide access permissions which control whether certain regions of an address space are accessible to particular processes executing on the pipeline 4. While for conciseness the MMU 36 is shown in FIG. 1 as connected to the load/store unit 28 for use in data accesses, the MMU 36 may also be used for translating addresses and checking access permissions of instruction fetch addresses issued by the fetch unit 6 when fetching instructions for execution.

FIG. 1 is just one example of a possible processor architecture and other examples may have other components not explicitly indicated in FIG. 1.

To assist with software development, the processor 2 is provided with hardware resources which allow gathering of profiling information about the behaviour of instructions processed by the processing pipeline 4, which a software developer can use to perform code optimization with the aim of modifying their code to run more efficiently. Sampling circuitry 50 is provided to select certain instructions or micro-operations as sampled operations to be profiled by profiling circuitry 52. The sampling circuitry 50 can select the sampled operations at different stages of the pipeline. For example, the sampling circuitry 50 may select certain fetched instructions as sampled operations and tag those fetched instructions at the fetch stage 6 to label those instructions to indicate that, as the instruction progresses down the pipeline 4, the profiling circuitry 52 should gather information on the behaviour of the sampled operation. Alternatively, the tagging of instructions of sampled operations by the sampling circuitry could take place at the decode stage 8 or at a later stage. Also it is possible that sampled operations are selected at the granularity of individual micro-operations rather than at the granularity of the architectural program instructions fetched from memory.

Figure 2:
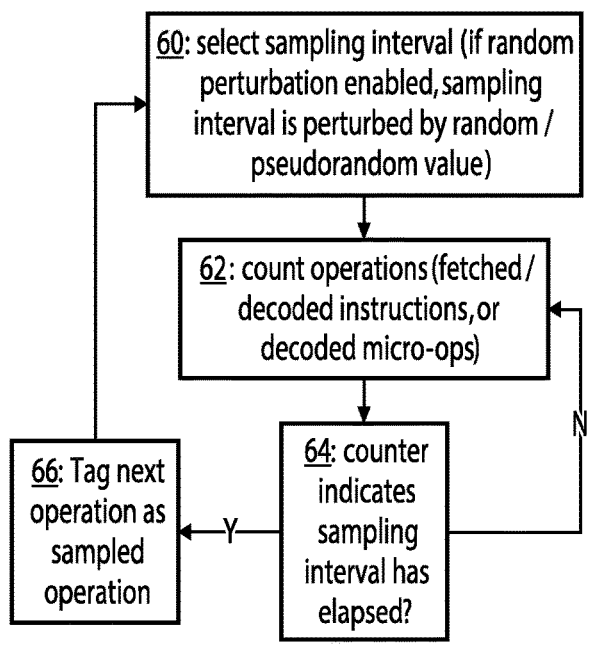
FIG. 2 illustrates sampling of instructions or micro-operations to select operations for which a sample record is to be captured.

The sampling circuitry has an interval counter 54 for counting instructions or micro-operations to determine when the next sampled operation should be selected. FIG. 2 shows a flow diagram showing sampling of operations by the sampling circuitry 50. At step 60 the sampling circuitry 50 selects a particular sampling interval which represents the number of instructions or micro-operations to be counted between two successive sampled operations being selected. The sampling interval could be defined by a user-configurable parameter in a control register, or could be fixed to a particular interval. Optionally, the sampling circuitry 50 may support a random perturbation function where the set sampling interval selected by the user may be perturbed by a random or pseudorandom value generated by a random number generator or pseudorandom number generator 56. While FIG. 1 shows the pseudo random number generator 56 being within the sampling circuitry 50, in other examples the sampling circuitry could reuse (pseudo)random numbers generated by a (pseudo)random number generator provided elsewhere in the processing system which is also used for other purposes other than instruction or micro-operation sampling. For example the (pseudo)random number generator 56 could generate a random value in a certain range which is added to (or subtracted from) the sampling interval specified as the nominal sampling interval by the user, to generate the sampling interval to be counted by the interval counter 54 for the next period of operation. Enabling random perturbation can be useful, because it reduces the risk that when processing a loop of instructions, the same instructions or micro-operations keep being selected as the sampled operation on multiple iterations of the loop. In some implementations it may be optional whether random perturbation is enabled or disabled, with a user-configurable control parameter selecting whether random perturbation is enabled.

Hence, at step 60 the sampling interval is selected (either set to a fixed value, or directly specified by a variable user-configurable parameter, or randomly or pseudo randomly perturbed from a fixed/variable interval value), and then at step 62 the interval counter 54 begins to count the number of operations processed by the processing circuitry 4. The counted operations could either be fetched instructions, decoded instructions or decoded micro-operations. Some systems may only support one of these options. Other systems could support the ability for the user to set configuration data which selects which type of operation is counted by the interval counter 54. At step 64 the sampling circuitry 50 determines whether the interval counter 54 indicates that the sampling interval selected at step 60 has elapsed, and if not then the interval counter 54 continues to count operations. The determination of whether the counter has indicated that the sampling interval has elapsed could be performed in different ways. For example, the counter could be set to a value corresponding to the selected sampling interval at step 60 and then decremented each time one of the counted operations is seen, and may be considered to elapse when the counter either reaches 0 or overflows beyond 0. Alternatively, the counter could be reset to 0 at step 60 and then be incremented or decremented in response to each counted operation at step 62, and considered to elapse when at step 64 a comparison between the counter and a value corresponding to the sampling interval indicates that a sufficient number of operations have been counted to reach the sampling interval value.

Regardless of how the elapse of the sampling interval is determined, if the sample interval has elapsed then at step 66 the next operation (e.g. fetched instruction, decoded instruction or decoded micro-operation) is tagged as a sample operation. For example, a tag bit associated with instruction may be set, and this tag bit may accompany instruction or micro-operation selected as the sampled operation as it progresses down the pipeline 4. The sampling circuitry 50 then returns to step 60 to reset the counter 54 once more based on a new sampling interval (which could be the same as the previously set sampling interval if random perturbation is not supported or is disabled, or could be different to the previously set sampling interval if random perturbation is enabled). By looping round FIG. 2, sampled operations continue to be selected at periodic intervals.

An advantage of selecting only a subset of operations as a sampled operation is that this greatly reduces the overhead in tracking information for profiling. For example, the sampling interval could be set to be long enough that in practice only a single operation in flight within the pipeline 4 is selected as a sampled operation at a time, so that the profiling circuitry 52 need only be provided with sufficient hardware resources to track behaviour of a single sampled operation at a time. This avoids the overhead of having to index storage structures which can store information for multiple operations, based on an operation identifier associated with a particular sampled operation, to select which entry of the storage structure to update based on information for the particular sampled operation.

Nevertheless, other implementations may choose to incur a greater hardware cost and may choose to support multiple sampled operations being selected at a time. In those embodiments, the sampling of a subset of operations as sampled operations still has the advantage of greatly reducing the amount of profiling information generated compared to implementations which will attempt to track every instruction, making it feasible for a wider range of data to be captured for each sampled operation and hence for more meaningful profiling analysis to be performed.

The profiling circuitry 52 comprises monitoring circuitry 70 for gathering information about the behaviour of sampled operations selected by the sampling circuitry 50. Although the monitoring circuitry 70 is shown as a single block within the profiling circuitry 52, in practice the monitoring circuitry may include a number of elements distributed about the processor to gather information from different components of the processor. For example the monitoring circuitry 70 may include event detection circuitry to detect occurrence of various types of events for a sampled operation. The types of events detected may depend on the type of sampled operation. For example, for a branch operation selected as a sampled operation, the events could track whether a branch misprediction occurred or whether the branch predictor 18 correctly predicted the branch. For load/store operations the events could include, for example, whether the load/store operation missed in a certain level of cache 30, 32, whether the address translation lookup for the load/store instruction missed in the TLB 38 or in a particular level of TLB, or whether an address fault occurred for the load/store instruction. Other types of events which may be monitored may be instruction fetches missing in the instruction cache 16, faults such as an undefined instruction exception, or whether certain instructions were delayed due to contention for resources. The monitoring circuitry 70 may also capture information about particular instructions, such as the instruction address of the sampled operation, a target address of a load/store operation or a branch target address of a branch operation, and items of architectural state from the registers 20 that are captured at the point when the sampled operation reaches a certain stage of processing (for example, context identifiers identifying the processing context in which the sampled operation was processed). The monitoring circuitry 70 may also have cycle counters which count the number of processing cycles taken for certain operations to complete, such as measuring the latency of an address translation or cache lookup, or the number of cycles for an operation to progress between a first point of processing and a second point of processing, for example. Hence, it will be appreciated that a variety of information can be gathered by the monitoring circuitry 70.

The captured monitoring information can be recorded in a sample record stored in sample record storage circuitry 72 (e.g. registers or a buffer) of the profiling circuitry 52. The sample record may be generated using a packetized format as described below. Within a sample record captured for a given sampled operation, the record may specify the type of operation associated with the sampled operation (e.g. whether it is a branch, a load/store operation or an ALU operation, etc.) and also provides various information directly attributed to the sampled operation. The capture of the sample record in the sample record storage 72 is performed in hardware in the background of processing being performed on the pipeline 4, so does not require any specific software instructions to be executed to gather the information within the sample record.

Filtering circuitry 74 is provided to allow the profiling circuitry 52 to select whether a sample record captured for a particular sampled operation is made accessible for diagnostic analysis. In the embodiment shown in FIG. 1, a sample record can be made accessible for diagnostic analysis by writing it to a profiling buffer structure 76 stored in the memory system 34. The address range allocated for use as the profiling buffer 76 may be determined based on buffer address identifying information stored in configuration registers 78 of the profiling circuitry 52, which can be set by a user under software control. The configuration register 78 may also include configuration information which specifies what types of information should be included within the sample record for particular types of sampled operation, and for setting the filtering criteria used by the filtering circuitry 74 to determine whether sample record writing circuitry 79 should write the captured sample record from the sample record storage 72 to the profiling buffer 76. The writing of the sample record to the profiling buffer 76 in memory may be performed without needing to interrupt the processing on the pipeline 4, so that no specific software instructions are needed to cause the sample record to be stored to the memory system. Hence, a certain number of sample records can be output to the profiling buffer 76 without any interrupts occurring, until sufficient number of sample records have been generated and written out that the profiling buffer risks overflowing, and at that point a performance monitoring interrupt could be triggered to cause the processing to be interrupted and so that the exception handler could then take action to ensure that the sample records previously stored to the profiling buffer 76 can remain accessible for diagnostic analysis (e.g. by updating the address parameters in the configuration register 78 to allow subsequent sample records to be stored to a profiling buffer in a different region of the address space, or by reading out the sample records from the profiling buffer and storing them elsewhere or outputting them for external analysis). Although FIG. 1 shows an example where sample records are made accessible for diagnostic analysis by writing them to the memory, an alternative would be to output them to a trace buffer 73 which is a dedicated hardware structure separate from the memory system 34 for storing diagnostic information on-chip, and/or to output the captured sample record over a trace output port 75 (either directly or via the trace buffer 73), where the trace output port is a set of integrated circuit pins via which the sample record can be output to an external off-chip trace analyser or storage device. Some systems may support this trace output functionality instead of the ability to write sample records to memory, while other may support both approaches and may use configuration information in the register 78 to select which approach to use.

Figure 3:
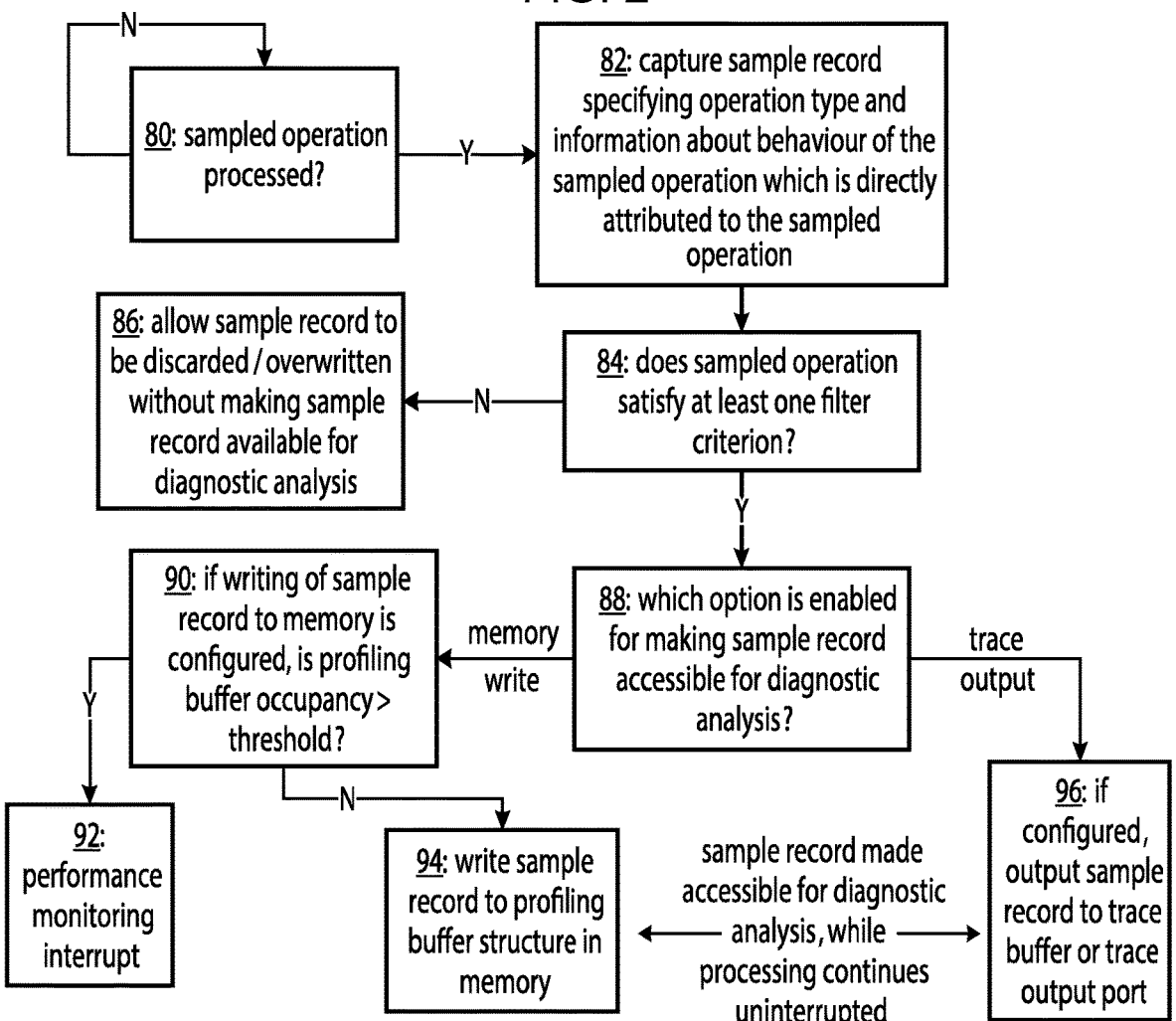
FIG. 3 is a flow diagram illustrating capture of a sample record for a sampled operation and filtering of whether the sample record is made accessible for diagnostic analysis.

FIG. 3 is a flow diagram showing profiling by the profiling circuitry 52. At step 80 the profiling circuitry 52 determines whether a sampled operation is being processed. If not then no monitoring is needed. Eventually, once a sampled operation selected by the sampling circuitry 50 has been identified, then at step 82 the monitoring circuitry 70 captures a sample record specifying the operation type of the sampled operation and information about behaviour of the sampled operation which is directly attributed to the sampled operation. The sample record could also include other information not directly attributed to the sampled operation, such as a snapshot of register state for example (e.g. current values of condition code flags used to determine outcomes of conditional instructions could be captured, regardless of whether those condition code flag values were directly caused by the sampled operation). The captured sample record is stored in the sample record storage 72. It will be appreciated that step 82 may include a number of separate instances of capturing various pieces of monitoring information at various points of the processing system, which may not all be ready at the same time. The sample record in the sample record storage 72 could be composed gradually of a number of pieces of information gathered at different points of the pipeline. Alternatively, the monitoring circuitry 70 could include some temporary registers which track events and pieces of information as they are detected which can then be used to compose the sample record in a known sample record format ready for output.

At step 84, the filtering circuitry determines whether the sampled operation satisfies at least one filter criterion specified in the configuration registers 78. This filtered criterion could be based on the operation type of the sampled operation (e.g. a user may have configured the filter to gather information only about branch operations and not about other types of operations if they are selected as the sampled operation). Also the filter criterion could depend on some of the monitored information captured by the monitoring circuitry 70 and/or information added to the sample record. For example, a filter criterion could specify that only records associated with mispredicted branches should be allowed to pass the filter, or that the sample records for load/store instructions which miss in the level one data cache 30 should be tracked. The particular filter criteria set depend on the user-controlled configuration data in registers 78 and could include several alternative criteria combined in an OR operation so that sample records meeting any one or more of multiple criteria could be allowed to proceed beyond the filter, or combined in an AND operation so that sample records meeting each of two or more criteria pass the filter, but sample records which only pass one of these criteria are rejected.

If the sampled operation does not satisfy the at least one filter criterion then at step 86 the profiling circuitry 52 allows the captured sample record to be discarded or overwritten without making the sample record available for diagnostic analysis. Hence there is no need to write this sample record to the memory system or output it to the trace buffer 73 or the trace output port 75. The next time a sampled operation is processed then any previously captured information can be overwritten.

If the sampled operation does satisfy the at least one filter criterion then at step 88 it is determined which option is enabled for making sample records accessible for diagnostic analysis. If the system has the sample record writing circuitry 79 and writing of the sample record to memory is enabled then at step 90 the profiling circuitry 52 determines whether a current occupancy of the profiling buffer 76 exceeds a set threshold, and if so then at step 92 a performance monitoring interrupt is triggered to interrupt processing on the pipeline 4 and invoke execution of an exception handler (in software) which may then take action to avoid the profiling buffer overflowing so that sample record capture can continue. For example the exception handler could update the profiling buffer address parameters to indicate a different address range, allocate additional capacity to the profiling buffer 76, or transfer information from the profiling buffer 76 to a different storage location to allow the same profiling buffer location to continue to be used. The threshold used at step 90 can be set to match the capacity of the profiling buffer or could be set at a level below the maximum capacity so that the performance monitoring interrupt can be triggered before the overflow occurs. If at step 90 the threshold has not yet been reached, then at step 94 the sample record captured in the sample record storage 72 can be written out to the profiling buffer 76 in memory and a parameter tracking the current buffer occupancy can be updated to reflect the updated buffer occupancy. The write at step 94 is triggered by the sample record writing circuitry 79 while processing continues uninterrupted on the pipeline 4.

On the other hand, if at step 88 a trace output method is enabled and supported, then at step 96 the sample record captured in the sample record storage 72 is made available for diagnostic analysis (while processing continues uninterrupted) by outputting the sample record to the trace buffer 73 and/or over the trace output port 75 to an external device. Some systems may support both the memory write and trace output options and others may support only one of these options.

FIG. 4 illustrates an example of a packetized format of the sample record 100 captured for a given sampled operation. The sample record 100 may comprise a number of packets 102 where each packet is selected from a set of available packet types that can be used. Each packet may include at least a header portion 104 which identifies the type of packet and optionally may also include other information (e.g. even within packets of a single type there may be a number of variants which may be distinguished by the packet header, or a limited amount of information about the sampled operation itself may be indicated in the header). Also the header can specify a size of the associated payload 106 which provides the monitoring data associated with that packet. Some types of packets may not have a payload 106 and may only comprise a header 104. For example the packet types may include the following:

Header packet: provides header information for the sample record 100 as a whole. For example the header packet may specify a profiling source identifier which identifies the source which captured the sample record. For example in a multi-processor system there may be multiple processor cores which each have profiling circuitry 52 and the source ID could distinguish wish instance of a processor core processed the operation for which the sample record was captured.

Time stamp packet: provides a system timer value identifying a time at which the sampled operation was processed.

Context packet: provides one or more context identifiers identifying a processing context in which the sampled operation was processed. For example the context identifiers could include an address space identifier distinguishing between processes associated with different virtual address spaces, and/or a virtual machine identifier identifying a virtual machine in which the sampled operation was processed.

Events packet: provides a summary of one or more events occurring for the sampled operation. For example the events packet may provide an event mask which includes a number of bits where each bit indicates whether or not a corresponding type of event occurred. The header portion 104 of the event packet could distinguish between multiple alternative types of event mask for indicating different sets of event types. This avoids the need to encode event masks for sets of event types where none of the events occurred.

Counter packet: provides at least one counter value which indicates a latency associated with a particular action taken for the sampled operation. For example the latency could be associated with a memory access operation or an address translation. The latency could also indicate the number of cycles between the sampled operation reaching a given point of a pipeline and reaching a given later point in the pipeline.

Operation type: a packet indicating the type of operation sampled. For example, the operation type could distinguish between load/store operations, branch operations or ALU operations.

Address packet: indicates an address associated with the sampled operation.

End marker packet: indicates the end of the current sample record 100 so that any subsequent packet will be interpreted as being part of the next sample record. Use of an end marker packet 102 can be useful to support sample record formats with a variable size so that a variable number of packets can be included depending upon how much information of interest there is to record. However, other approaches may have a fixed format of sample records of some known size (or may fix the size of the sample record for a given type of sampled operation, which could differ from the fixed size use for other types of sampled operations). If fixed-size record formats are used, the end marker 102 may not be needed.

Padding packet: used to fill remaining portions of fixed-size sample records, if a fixed-size format is used. The padding packet has no payload.

The particular encoding used for the header portions 104 to identify which type of packet is represented is arbitrary, and can be selected according to the needs of a particular system. Some packet types may support a header which may be of a variable size so that a prefix header could be provided to provide extra information in addition to the normal header, where including the prefix is optional, so that the same header can be included both with and without prefix. In some cases, the header may specify the size of the payload 106 so that variable size payloads are possible. The number of packets included in the sample record for a given type of sampled operation may vary, for example some records may require a greater number of events, counters or addresses to be included than others.

FIG. 5 shows an example of a sample record 100 for a load instruction (selected as an arbitrary example). The portions with underlined text represent packet headers 104 and the following portions with non-underlined text represent packet payloads 106. It will be appreciated that the particular contents of the sample record depend on what happened when the sampled operation was processed so could vary significantly. In the particular example of FIG. 5, the sample record includes a header packet providing the source ID, a timestamp packet providing a system timer value, two address packets (the first address packet providing the program counter address identifying the instruction address of the load instruction itself, and the second address packet identifying the data address representing the target address from which the load is to be performed), two context packets specifying the address space identifier (CONTEXTIDR_EL1) and virtual machine identifier (CONTEXTIDR_EL2) respectively, an operation type packet which in this example includes a prefix header indicating the size of the data access associated with the load operation, with the main operation type header indicating that the sampled operation is a load (rather than a branch or ALU operation). The sample record also includes two counter packets which provide latency count values, in this example indicating a first count value indicating the latency between the sampled operation being issued and the address of the load operation being generated, and a second count value indicating the latency between the address being generated and the data for the load being returned from the memory system. The sample record also includes an events packet which provides a mask indicating one or more events that occurred for a load (such as cache hit/misses, address translation hit/miss in the TLB 38 etc.). Finally the sample record includes the end marker packet. Hence, the sample record 100 provides detailed information on the outcome of the sampled operation, how long the operation took to process and other information about when the operation was processed and in what context, which can all be useful for a software developer to diagnose potential issues with their code.

FIG. 6 shows an example of an address packet 102 in more detail. For an address packet, the address type header 104 has a value indicating that the packet is an address packet (distinguishing from other types of packet) but also identifies the particular type of address represented in the payload, selected from one of a number of different types of addresses. For example the address in the payload can be identified as one of: an instruction virtual address identifying the address of the instruction associated with the sampled operation itself, a data access virtual address identifying the target address of a data access, a branch target address identifying the address to which a branch should direct program flow if the branch is taken, or a reference instruction address, which marks an address of a reference instruction for which execution proceeded sequentially (without a taken branch) between any two of the intervening instructions positioned in program order between the reference instruction and the given instruction corresponding to the sampled operation.

Figure 7:
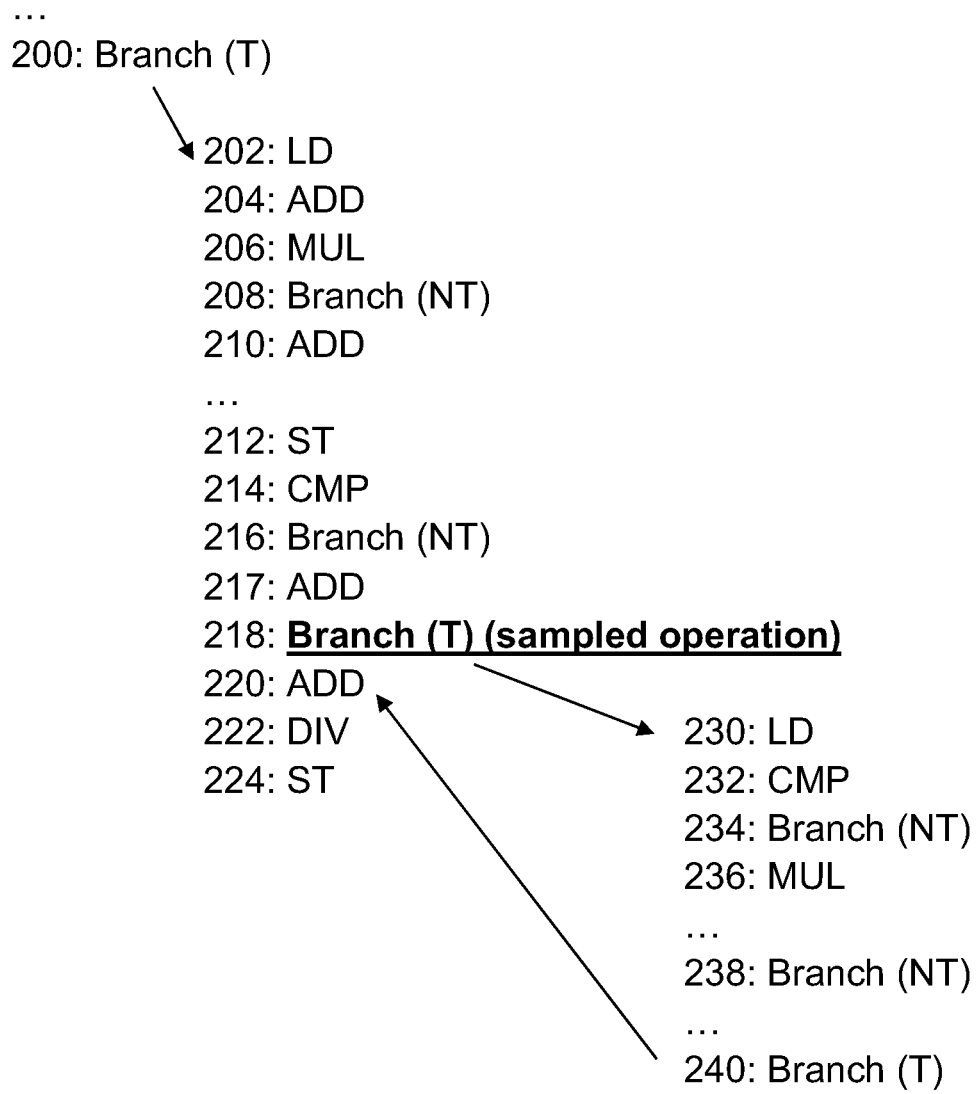
FIG. 7 illustrates an example of a sequence of program instructions including branch instructions.

Use of the reference instruction address packet is discussed further below with respect to an example sequence of instructions shown in FIG. 7. In the example of FIG. 7, a taken branch instruction 200 leads to processing of a block of instructions 202, 204, etc., including several not-taken branch instructions 208, 216, before a further taken branch occurs at instruction 218. Taken branch instruction 218 in this example represents a function call to function code at instructions 230-240, where the function code terminates with a return branch 240 which is taken to return processing to instruction 220 just after the previous taken branch 218. Other than taken branches 200, 218, 240, all other branch instructions in this example are not taken. The taken branch instructions represent points of non-sequential program flow. Between any two taken branches the intervening instructions are executed sequentially (meaning that there is no taken branch between these instructions—as in an out-of-order processor it is possible for the intervening instructions to be executed in an order different from program order (if instruction 210 is executed out of order before instruction 206, this would not be considered a non-sequential change of program flow)).

In this example, it is assumed that taken branch instruction 218 is selected as a sampled operation by the sampling circuitry 50 and so the profiling circuitry 52 captures a sample record for the taken branch 218. The sample record for the taken branch 218 can include a reference instruction address packet as described above to identify an address of a reference instruction, which is an earlier or later instruction than the taken branch for which (not including any non-sequential change of program flow associated with the taken branch itself) control flow is sequential in the sequence of intervening instructions between the sampled operation 218 and the reference instruction. As can be seen in FIG. 7, if the branch 218 is sampled as the sampled operation, the reference instruction could be any of the instructions 202-217 before the taken branch 218 or any of the instructions 230-240 after the taken branch 218 (which did not encounter any intervening non-sequential change of program flow beyond that triggered by the taken branch 218 itself). However, instruction 200 or instructions 220-224 cannot be indicated as the reference instruction by the reference instruction address packet, as there has been an intervening non-sequential change of program flow.

The reference instruction address packet is useful for enabling the sample records captured by the profiling circuitry 52 to be used to assist with profile-guided optimization (PGO) of program code. PGO is a technique used by programmers to use profiling to improve program runtime performance. PGO recognises that some portions of program code are executed more frequently than others and so it can be most efficient to focus any development efforts on optimizing performance for the more frequently executed portions of code in preference to less frequently executed sections. Even without the ability for the sample records to track the reference instruction address, the sample records captured by the profiling circuitry 52 based on systematically sampled instructions or micro-operations selected by the sampling circuitry 50 could be used to assist with PGO. For example, after profiling is complete, the profiling buffer 76 may contain records for the sampled operations which pass the filter set by the filtering circuitry and sample records associated with any type of instruction may specify the instruction address (program counter, or PC) associated with the sampled operation. This can be used to generate a basic profile of the program, such as a hot-spot profile indicating the relative frequency of execution of different instructions. The programmer or compiler may use the profile to guide them on the regions of code to focus on for performance improvement.

However, an issue with systematic sampling of operations for profiling is that most operations performed by the processing circuitry are not tracked by the sample records written to profiling buffer 76. Based on the PC addresses of each sampled operation, from a single sample record it is only possible to deduce that one particular instruction was executed, not any earlier instructions (as the sampled operation could have been the branch target of some unknown branch). Hence, if each sample record only provides evidence that a single instruction was executed, this means that to collect enough information that the collected samples are sufficient to gain a statistically valid view of the relative frequency of execution of different portions of code, a very large number of samples may need to be collected, which may not be practical given the data rate and storage overhead needed.

In contrast, other types of diagnostic monitoring technique could support capture of a more limited set of information per instruction. For example, consider for comparison a trace solution where a storage element is provided to record branch records for the last 16 taken branches, where each branch record stores two addresses: the instruction address of the taken branch and the branch target address of the taken branch. Each time a taken branch is encountered then the oldest record is discarded and a record for the latest taken branch allocated to the storage element. At intervals of a certain number of instructions (e.g. every 1,000,000 instructions) an interrupt is generated to cause the record of the last 16 taken branches to be sampled and written out to memory or output over a trace port. If instructions are being executed at 1,000,000,000 instructions per second then this would generate around 1000 samples per second (and hence 1000 interrupts per second). On average, it is common that approximately 1 in every 10 instructions may be a taken branch, so 16 taken branches may span around 150 instructions approximately (note, the number of instructions represented by 16 branches is not 160, because of the "fencepost" property of the branch records— 15 blocks of 10 instructions each would be bounded by 16 taken branches). Therefore, the record of the last 16 taken branches gives evidence that approximately 150 instructions were executed, which can be used to develop the hot-spot profile for PGO as discussed above. With 1000 samples per second, this means that the profile can be based on approximately 150,000 instructions per second. If each branch record is 16 bytes (e.g. two 64-bit addresses) of data, then each sample would be 256 bytes, meaning about 250 KB/s of data collected. However, a problem with such a simple trace solution is that this sampling only captures the instruction address and branch target address of a taken branch instruction and does not provide any other diagnostic information.

Returning instead to discussing the statistical sampling based method described in the embodiment of FIG. 1, this has the advantage that many other types of information can also be recorded. However, this is at the expense of generating much larger sample records. To be able to match the trace approach in being able to count 150,000 instructions per second as contributing to the hot-spot profiling, this would require the sampling circuitry 50 to use a sampling rate of around 1 in every 6700 instructions. Assuming that each sample record comprises 64 bytes (for example—using a fixed size format achieved by using the padding packet described above can simplify hardware implementation) and a 64 KB buffer 76 is allocated in memory so can hold 1024 samples, this means that compared to the trace example the interrupt rate is greatly reduced to around 145 samples (interrupts) per second as the interrupt only needs to be generated once the 64 KB buffer is full rather than on each sample as in the trace solution above. However, with the statistical profiling solution the data rate vastly increases to 9 MB per second, almost 40 times higher than the trace solution. The reason for this increased data rate is that a much larger set of information is being gathered per sample, and while statistical sample-based profiling would normally be expected to operate at a relatively low sampling rate, to be able to match the number of samples needed to give a reasonable PGO hot-spot profile, the sampling rate would need to be increased. Hence, based on capturing the PC of each sampled operation alone, it can be difficult to use sample-based profiling techniques to assist with PGO.

However, by providing the capability to include, within the sample record for a sampled operation, a form of address packet which can encode an address provided as a reference instruction address which marks a point earlier or later in program order than the PC of the sampled operation where the intervening processing was sequential, this means that each sample record now can provide evidence that not only was the current sampled operation executed, but also a certain number of other instructions were also executed (without needing to include additional sample records for those other instructions). By increasing the number of instructions whose execution can be deduced per sample record, this reduces the number of sampled operations needed to track execution of a certain number of instructions for the hot-spot profile. This can greatly reduce the data rate needed.

Again, continuing with the previous numeric example, if this additional reference instruction address indicator was included only in the samples collected for taken branches and indicates the branch target address of the most recent taken branch, and the filter 24 is configured to allow only the sample records for taken branches to be written to the profiling buffer 76, then assuming the sampling rate is still 1 in every 6700 instructions, the filter 74 will discard around 90% of the sampled operations (assuming around 1 in 10 operations is a taken branch), but now each sample record gives evidence that (on average) 10 instructions including the sampled instruction were executed. Hence, 10 times fewer sample records are needed to reach the ~150,000 instructions counted towards the hot-spot profile to compete with the trace solution described above. If each sample record is still 64 bytes as described above, this approach reduces the data rate to 930 KB per second, 10 times less than sample-based profiling using the PC address only, and much closer to the trace solution described above. However, unlike the trace solution each sample record has also provided a much greater range of information about the processed operations, e.g. including cycle counts, even masks etc. Hence, this approach enables other types of performance analysis to be performed using the same set of sample records as the sample records used for PGO profiling, which would not be possible with the trace solution. Hence, software development can be much more efficient.

The filter circuitry 74 may support different options for selecting which sample records are made available to the developer for diagnostic analysis, and may support one option where the filter may only select sample records for taken branch instructions, and another filter setting where both the taken and not taken branches have their sample records pass the filter. It may be assumed that to gain the largest amount of information per sample on the execution frequency of nearby instructions in program order, for a given sampled operation it may be desirable to track the location of the most recent taken branch or the next taken branch in program order as this can maximise the range of intervening instructions that can be deduced as executed.

However, it has been observed experimentally that if the filter allows both the taken and not taken branches to have their sample records output for analysis and both the taken and not taken branch samples include the reference instruction address indicator, this can cause a statistical bias in the hot-spot profile determined based on the captured reference instruction address indicators. The reason is as follows.

Consider the example of FIG. 7, where for sake of argument it is assumed that the intervening branches 208, 216 between taken branch 200 and taken branch 218 have a consistent behaviour so that they are always not taken (for example, branches 208, 216 could be testing for rare error conditions which did not occur in the current execution run), and that there were no other branches into the middle of the sequence 202-218 so that each time this code was executed, the code was reached after a branch from instruction 200 to load instruction 202. As branches 208 and 216 were never taken, then this would mean that all of the instructions 202 to 218 would have been executed an equal number of times, so any hot spot profile should indicate equal execution counts for the entire sequence of instructions 202 to 218.

If the filter 74 passes sample records for only taken branches, but discards the sample records for not-taken branches, and the reference instruction address indicator is included in the sample records for the taken branches to indicate the branch target address of the most recent taken branch, then as shown in FIG. 8, the sample record for taken branch instruction 218 may indicate the address of instruction 202 which was the branch target of the most recent taken branch 200. Similarly, if taken branch 240 had been selected as a sampled operation, then its sample record would have indicated a reference instruction address indicator indicating instruction 230 at the branch target address of the most recent taken branch 218. This approach would be acceptable when the filter 74 is allowing only taken branch sample records to be output, because each time taken branch 218 is sampled all of the instructions 202-218 will be deduced as executed, so the hot-spot profile would provide a fair representation of the relative frequencies with which one instruction in the block 202-218 was executed compared to another instruction in the block 202-218.

However, if the filter 74 was set instead to allow sample records for both taken and not-taken branches to be output for diagnostic analysis (and both taken and not-taken samples record the branch target of the most recent taken branch), then this would mean that regardless of whether the sampled operation is selected as taken branch 218 or an earlier not-taken branch 216, the sample record would specify the same address representing the branch target 202 of the most recent taken branch. Hence, if not-taken branch 216 was sampled, the hot-spot profile would deduce that instructions 202-216 were executed, but if taken branch 218 is sampled, the hot-spot profile would deduce that instructions 202-217 were executed. This would mean that while instructions 202-216 are deduced as having been executed regardless of whether the sampling selected branch 216 or branch 218, instruction 217 will only be deduced as having been executed when taken branch 218 is sampled but not when not-taken branch 216 is sampled. This means that instruction 217 may end up with a lower execution count in the hot-spot profile, even though in reality instruction 217 was executed just as often as instructions 202-216 because branch 216 was always not taken. Hence, sampling both taken and not-taken branches specifying reference instruction address indications, but using the reference instruction address indication to refer back to an earlier taken branch only, risks generating a biased profile.

This bias can be avoided by ensuring that the population of operation types used to generate the reference instruction address indicator matches the population of operation types used as the basis for the hot-spot profile. This can be achieved by providing profiling circuitry 52 which supports the ability for the reference instruction address indicator to indicate, as the reference instruction, the instruction to which program flow was directed after the most recent branch (regardless of whether that branch was taken or not taken, and regardless of whether that most recent branch was itself sampled). Hence, as shown in FIG. 9 the reference instruction address packet for taken branch 218 could indicate as the reference instruction the ADD instruction 217 which is the next instruction after the most recent not-taken branch 216 in program order. In contrast, if not-taken branch 216 had been sampled, then its sample record would have indicated the address of ADD instruction 210 after the preceding not-taken branch 210 in the reference instruction address packet. If not-taken branch 208 had been sampled, its sample record would have indicated the address of the LD instruction 202 (the instruction to which program flow was directed after the most recent branch 200 in program order—as branch 200 was taken then the reference instruction is the instruction at the branch target address of the taken branch, not the instruction at the next sequential address as for not-taken branches). This approach means that any one instruction will only be deduced as executed if the immediately following branch is sampled, which avoids the "double-counting" of some instruction for multiple different sampled branches which can artificially inflate the execution count for some instructions compared to others.

FIGS. 8 and 9 and the examples above describe an implementation where the reference instruction address tracks an address based on a branch target or next instruction after a previous branch. As shown in FIGS. 10 and 11, an alternative approach would be to use the monitoring circuitry 70 to track a reference instruction which is later in program order than the sampled operation.

As shown in FIG. 10, if not-taken branches are not to be used as reference instructions, then the reference instruction address indicator could indicate the address of the next taken branch after the sampled taken branch. For example, if taken branch 218 in FIG. 7 is sampled then the sample record for branch 218 may indicate the address of the next taken branch 240 in the reference instruction address packet.

Alternatively, to avoid the bias problem described above, if both taken and not-taken branches are to be used as reference instructions, then the reference instruction address should point to the address of the next branch in program order after the sampled operation (regardless of whether that branch is taken or not taken, and regardless of whether that branch is itself sampled), and so as shown in FIG. 11 for the example of FIG. 7 the sample record for operation 218 may indicate the address of the next not-taken branch instruction 234.

Whether or not not-taken branches are to be used as reference instructions may depend on the configuration information in the configuration registers 78 of the profiling circuitry 52, which is programmable by software executing on the processing pipeline 4 and/or by an external debug unit providing debug control signals via a debug/trace port 75. In one example, the filter settings for the filtering circuitry 74 could control whether not-taken branches are to be used as reference instructions—if the filter allows not-taken branch sample records to be output containing the reference instruction address indicator, then the not-taken branches may be treated as reference instructions, but if the filter prevents not-taken branch sample records being output for diagnostic analysis, the not-taken branches do not need to be treated as reference instructions.

However, in another example the configuration registers 78 may contain controls for defining what types of instructions can serve as the reference instruction, alongside the controls for the filter 74, and it may be left to software to create sensible combinations depending on the type of analysis being performed. For example, although mismatched combinations of filter settings and reference instruction definitions may create the bias discussed above, it may nevertheless not be a problem to output the sample records according to such mismatched combinations, provided the analysis software doing the profiling takes care when generating the profile to ignore information which is not reliable. For example, the software might want to disable the filter 74 entirely, so that a full range of operations are sampled because each sample contains profiling information that would be discarded by the filter (events, latencies, etc.). To create the unbiased hot-spot profile, the software could take care to pick only the reference instruction address packets output in the sample records for taken branches, even though the output sample records also include sample records for not-taken branches which are being used for other purposes. Hence software might want to be able to independently control the reference address criteria and the filtering criteria. For providing an architecture for the processing apparatus 2 which enables the software to obtain unbiased profiles, it may be sufficient to ensure that there is support to enable the profiling circuitry 52 to treat not-taken branches as reference instructions if this is desired by the software, but it is not essential to always use this functionality or to require that it is used for any particular set of filter settings.

In the example of FIGS. 7-11, the reference instruction addresses packets are included only for branch instructions and are not included for other types of sampled operation if selected. It is optional whether other operations would also track the reference instruction address if selected as a sampled operation.

Figure 12:
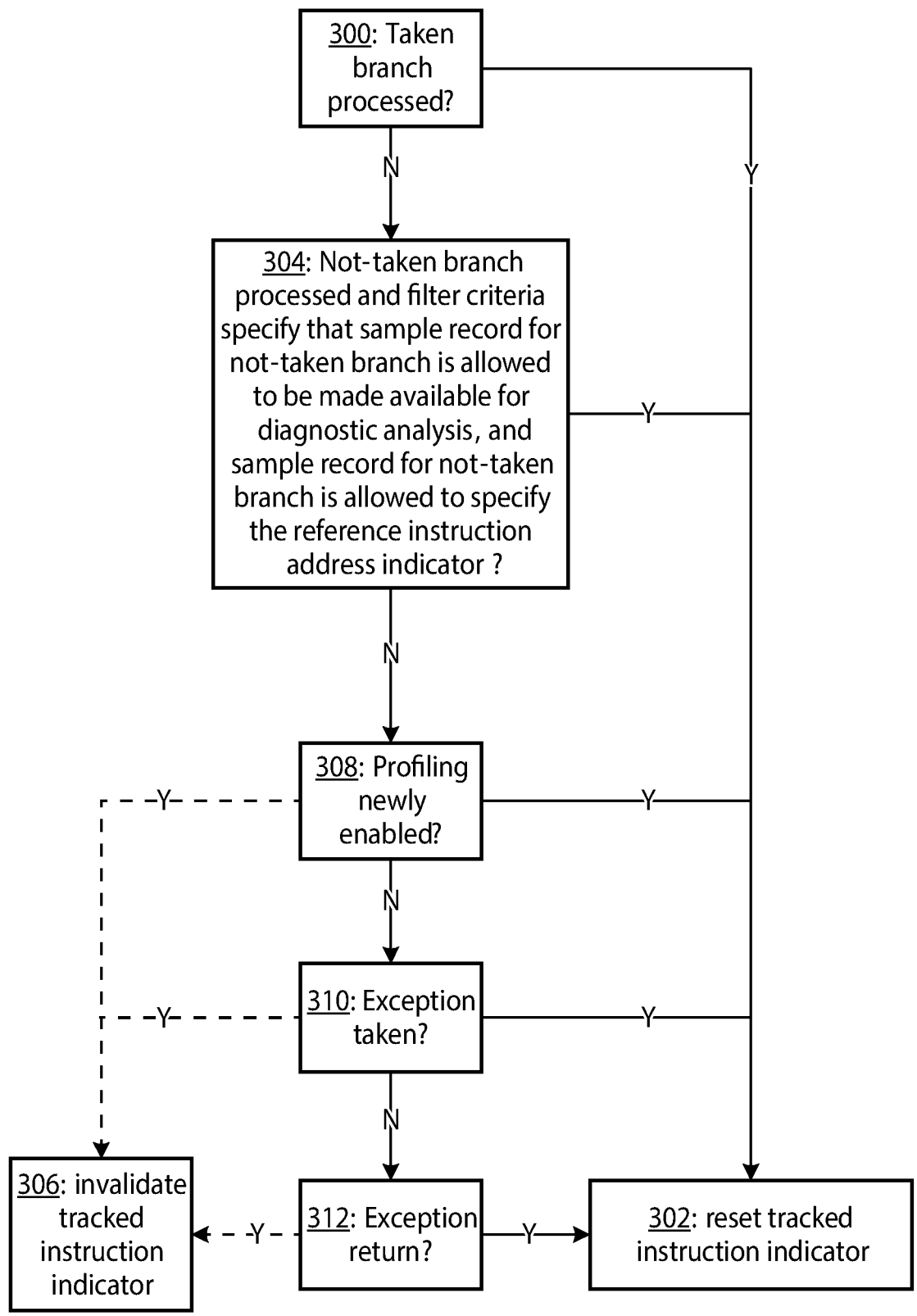
FIG. 12 is a flow diagram showing a method of using a tracked instruction indicator to track which address should be indicated as the reference instruction address for a subsequent sampled operation.
Figure 13:
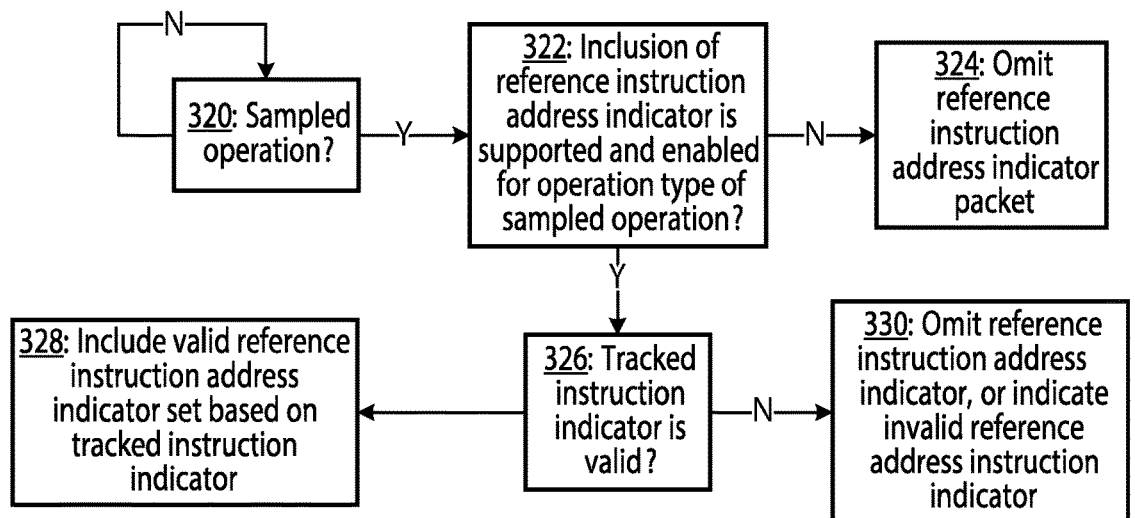
FIG. 13 is a flow diagram showing use of the tracked instruction indicator for setting the reference instruction address indicator for a sampled operation.

FIGS. 12 and 13 show flow diagrams illustrating methods for setting the reference instruction address for a sample record in an example where the reference instruction is the given instruction itself (if the given instruction immediately follows the most recent taken or not taken branch) or is an earlier instruction than the given instruction in program order. With this approach the monitoring circuitry 70 may include a storage element to store a tracked instruction indicator used to set the reference instruction address indicator for a sample record captured for a sampled operation. Various types of reset event cause the tracked instruction indicator to be updated, and then when a subsequent sampled operation occurs, the reference instruction address indicator can be set based on the tracked instruction indicator.

FIG. 12 shows the maintenance of the tracked instruction indicator. At step 300 the monitoring circuitry 70 determines whether a taken branch has been processed by the execute stage 12 and if so then at step 302 the tracked instruction indicator is reset and indicated as valid. The tracked instruction indicator could be represented in different ways. In one example the tracked instruction indicator may directly identify an address. In this case, at step 302 the tracked instruction indicator may be set to the address of the instruction following the taken branch (i.e. the branch target address of the taken branch). However another approach can be that the tracked instruction indicator acts as a counter to count a number of instructions processed since the point at which the reset tracked instruction indicator was reset. In such an embodiment, at step 302 the tracked instruction indicator can be reset to zero. As subsequent instructions are processed, the counter can then be incremented in response to each subsequently processed instruction.

If no taken branch is encountered, then at step 304 it is determined whether a not-taken branch is processed and the not-taken branch is to be used as a reference instruction (e.g. this could be when (a) the filter criteria being applied by the filtering circuitry 74 specify that sample records for not-taken branches are allowed to be made available for diagnostic analysis, and (b) the sample record for the not-taken branch is allowed to specify the reference instruction address indicator). If so, then at step 302 the tracked instruction indicator is reset and is valid, either by setting the tracked instruction indicator to indicate an address of the next instruction immediately following the not-taken branch in program order, or by resetting a counter to zero as described above. This ensures that a sampled taken/not-taken branch operation for which the most recent branch was a not-taken branch will have its reference instruction address indicator indicating the instruction after the most recent not-taken branch, rather than the branch target address of the most recent taken branch, to avoid the skew problem described above.

Otherwise, at step 308 it is determined whether profiling has been newly enabled, after a previous period of execution when profiling was disabled. Sometimes developers may not be interested in gathering sample records for the entire program, but may wish to focus on certain sections. Therefore, the profiling circuitry 52 may support the ability for profiling to be enabled or disabled at certain preconfigured instruction addresses set based on user-configured information in the configuration register 78. When profiling newly becomes enabled then any information in the tracked instruction indicator may be unreliable and so at this point at step 302 the tracked instruction indicator can be reset, e.g. by updating the tracked instruction indicator to indicate an address of an instruction representing the point at which profiling was enabled, or by resetting a counter to zero.

At step 310 the monitoring circuitry may determine whether an exception is taken and if so may proceed to step 302 to reset the tracked instruction indicator, e.g. by setting the instruction address to indicate an address of an instruction at the point when the exception was taken, or by resetting a counter to zero. Similarly, if an exception return occurs at step 312 then the tracked instruction indicator may be reset at step 302, e.g. by setting the instruction address to indicate the exception return address (the address of the instruction to which the exception returns processing). This prevents the tracked instruction indicator being skewed by operations performed during processing of the exception handler which are not representative of the program being profiled which was interrupted.

It will be appreciated that not all of the types of events checked at steps 300 to 312 may be applicable to a given implementation and some implementations may only check for a subset of these events. Also, while FIG. 12 shows a sequential series of checks performed in a certain order, it will be appreciated that other implementations could perform these checks in a different order, or could perform multiple checks in parallel.

In the example of FIG. 12, at step 302 the tracked instruction indicator is reset but remains valid. As shown in the dotted lines, an alternative can be that if one of the events detected at steps 308, 310 or 312 occurs, then the tracked instruction indicator could be invalidated at step 306. If the tracked instruction indicator is invalid when a sampled operation is processed, then the sample record may either omit the reference instruction address indicator or include an indication that the reference instruction address indicator is invalid.

As mentioned above, in some implementations, the processing of a sampled operation itself may also cause the tracked instruction indicator to be reset or invalidated.

FIG. 13 is a flow diagram showing how the tracked instruction indicator can be used to set the reference instruction address indicator for a sample record. At step 320 the profiling circuitry 52 detects whether a sampled operation is processed. When a sampled operation is detected then the monitoring circuitry 70 gathers information about the behaviour of the sampled operation. At step 322 it is determined whether, for the particular operation type represented by the sampled operation, inclusion of the reference instruction address indicator is supported and is enabled. Inclusion of the reference instruction address indicator may not be supported for all types of sampled operation. For example in some examples the reference instruction address indicator may only be included in sample records for branch operations, or only for taken branches but not not-taken branches (depending on implementation choice). Even among those operation types for which inclusion of the reference instruction address indicator is supported, the configuration register 78 may specify configuration data indicating whether to enable or disable the inclusion of the reference instruction address indicator. Hence, if either the current operation selected as the sample operation is not of a type for which the reference instruction address indicator is supported, or the configuration data indicates that the reference instruction address indicator should not be included, then at step 324 the reference instruction address indicator is omitted from the sample record.

If the reference instruction address indicator is to be included in the sample record for the current sampled operation then at step 326 the profiling circuitry 52 determines whether the tracked instruction indicator maintained as described in FIG. 12 is currently valid and if not then again the reference instruction address indicator can be omitted similar to step 324, or alternatively the sample record may include an explicit indication that the reference address instruction indicator is invalid. By providing support for indicating an invalid reference address or omitting it entirely this avoids statistical bias to profiles caused by including inappropriate addresses as the reference address.

On the other hand, if the tracked instruction indicator is valid then at step 328 a valid reference instruction address indicator is included in the sample record for the sampled operation, with the value of the reference instruction address indicator set based on the tracked instruction indicator. The particular format of the reference instruction address indicator can vary. If the tracked instruction indicator indicates an address of a particular instruction then this could be output explicitly as the reference instruction address indicator, similar to the examples in FIGS. 8 to 11 described above, so that the reference instruction address indicator indicates an absolute value of the reference instruction address. An alternative can be to compress the sample record by indicating the reference instruction address indicator as a relative address calculated relative to the instruction address (PC) of the instruction associated with the sampled operation itself. The difference between the reference address set in the tracked instruction indicator and the current program counter address associated with the sampled operation could be determined and encoded as the reference instruction address indicator. Another option is that if, as described above, the tracked instruction indicator is an instruction count counting the number of instructions that have been processed since the counter was reset, then the reference instruction address indicator could be set equal to the instruction count represented by the tracked instruction indicator. Regardless of the particular form taken, the reference instruction address indicator provides information which enables determination of the position of an earlier instruction in program order for which execution of the intervening instructions was sequential.

Figure 14:
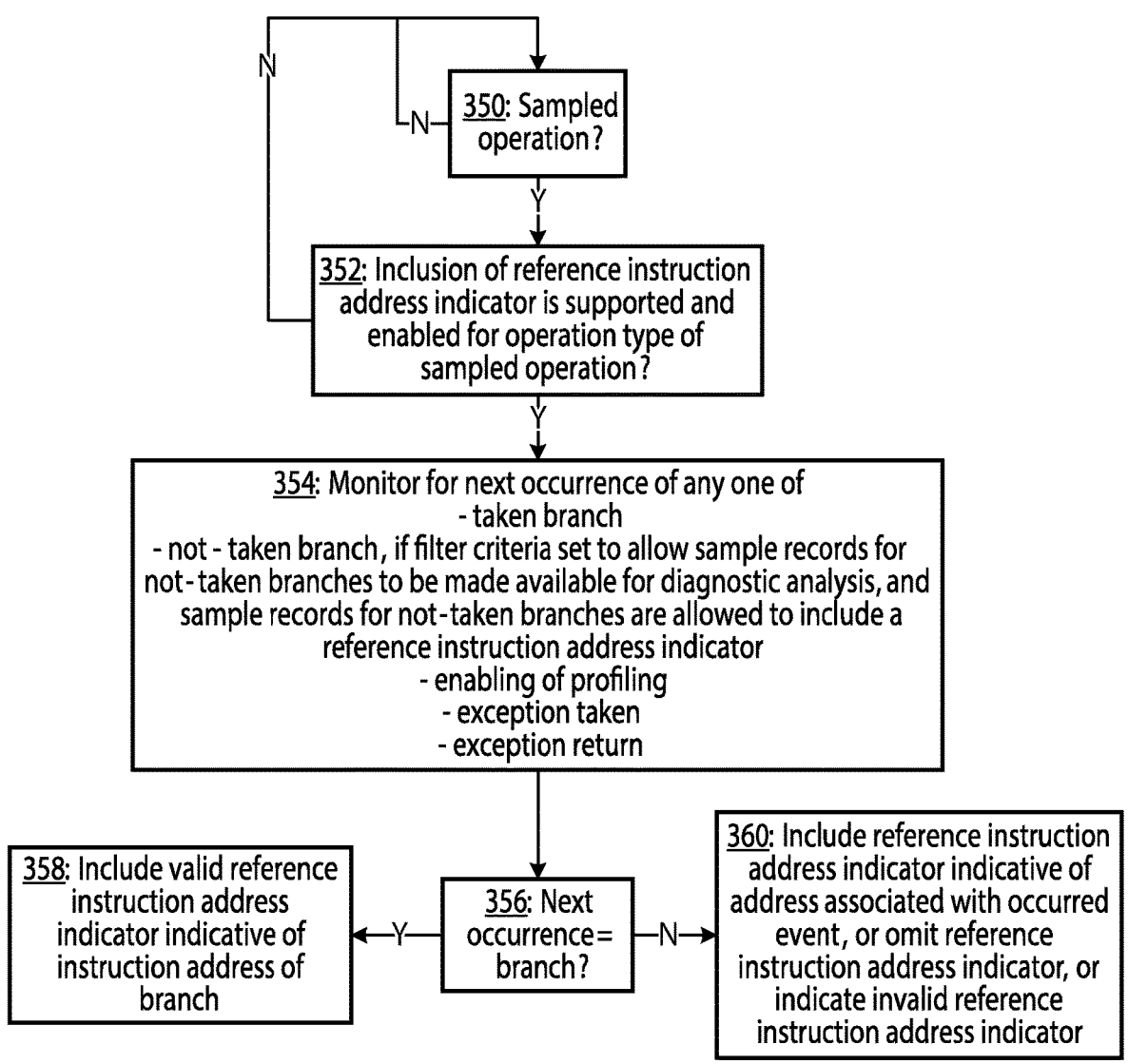
FIG. 14 shows a flow diagram showing a second example of setting the reference instruction address indicator where the reference instruction address indicator indicates an address of a later instruction in program order than the instruction associated with the sampled operation.

FIG. 14 shows an alternative approach for tracking the reference address, in embodiments where the reference instruction indicated by the reference address may be an instruction that is a later instruction in program order than the sampled operation. For example the reference instruction could be the next taken or not taken branch after the sampled operation or an instruction at which one of the reset events discussed above (enabling of profiling, exception taken, exception return) occurs. With this approach there is no need to maintain a tracked instruction indicator which is reset each time a branch is encountered. Instead, the monitoring circuitry 70 can wait for a sampled operation to be detected and then monitor for the next relevant event for setting the reference address indicator.

Hence, at step 350 the monitoring circuitry 70 detects whether a sampled operation has been identified, and if not then waits for the next sampled operation selected by the sampling circuitry 52 to be identified. Once the sampled operation is identified then at step 352 it is determined whether including the reference instruction address indicator in the sample record is both supported and enabled for the operation type corresponding to the sampled operation (as at step 322 of FIG. 13). If inclusion of the reference instruction address indicator is either not supported for the current sampled operation or is currently disabled then the method returns to step 350 to await a later sampled operation. It will be appreciated that in this scenario other information could still be included in the sample record for the sampled operation.

If inclusion of the reference instruction address indicator is both supported and enabled for the current operation type detected as the sampled operation then at step 354 the monitoring circuit 70 monitors for the next occurrence of any one of: a taken branch; a not taken branch (if the configuration information 78 specifies that not-taken branches should serve as a reference instruction); enabling of profiling after a previous period when profiling was disabled; an exception being taken; or an exception return event (and in some implementations, processing of another sampled operation, although in practice it is relatively unlikely that none of the other types of event would have occurred before the next sampled operation is detected). If any of these events occur then at step 356 it is determined whether the next occurrence was a branch and if so then at step 358 a valid reference instruction address indicator is included in the sample record for the sampled operation indicating information. For example the reference instruction address indicated could directly indicate the instruction address of the branch as an absolute value or as a relative value relative to the address of the instruction associated with the sampled operation, or the reference instruction address indicated could indicate the count of a number of instructions between the sampled operation and the branch (if a counter is used then the counter may be reset at step 350 when the sampled operation is detected).

If the event that occurred from the list shown in step 354 is an event other than a branch, then at step 360 a reference instruction address indicator can be included in the sample record, indicative of a reference address of a reference instruction associated with the occurred event. The reference address could be indicated as an absolute value, a relative value or as a count indicating the number of instructions between the sampled operation's instruction and the instruction at the point associated with the event detected at step 354. The reference address can be an address of an instruction representing the point at which profiling was enabled or the exception was taken, or could correspond to the exception return address. Alternatively, instead of indicating a valid reference instruction address indicator, at step 360 the reference instruction address indicator could be omitted from the sample record or indicated as invalid.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
 processing circuitry configured to perform data processing operations in response to instructions fetched from a cache or memory or micro-operations decoded from the instructions;
 sampling circuitry configured to select a subset of instructions or micro-operations as sampled operations to be profiled; and
 profiling circuitry configured to capture, in response to processing of an instruction or microoperation selected as a sampled operation by the sampling circuitry, a sample record specifying an operation type of the sampled operation and information about behaviour of the sampled operation which is directly attributed to the sampled operation; wherein:
 the profiling circuitry is configured to include, in the sample record captured for a sampled operation corresponding to a given instruction, a reference instruction address indicator indicative of an address of a reference instruction appearing earlier or later in program order than the given instruction, for which control flow is sequential between any instructions occurring between the reference instruction and the given instruction in program order, and
 the sampling circuitry is configured to select a next sampled operation in response to elapse of a sampling interval counted by an interval counter.

2. The apparatus according to claim 1, in which the profiling circuitry is configured to setting the reference instruction address indicator to indicate an address of an earlier instruction appearing earlier in program order than the given instruction, for which control flow is sequential from the earlier instruction to the given instruction.

3. The apparatus according to claim 1, in which the profiling circuitry is configured to setting the reference instruction address indicator to indicate an address of a later instruction appearing later in program order than the given instruction, for which control flow is sequential from a next instruction after the given instruction to the later instruction.

4. The apparatus according to claim 1, in which the profiling circuitry is configured to setting the reference instruction address indicator to indicate a branch target address of a most recent taken branch instruction prior to the given instruction or an instruction address of a next taken branch instruction after the given instruction.

5. The apparatus according to claim 1, in which the profiling circuitry is configured to setting the reference instruction address indicator to indicate an instruction address of one of: an instruction to which program flow is directed after a most recent branch instruction prior to the given instruction, regardless of whether the most recent branch instruction was taken or not taken; or an instruction address of a next branch instruction after the given instruction, regardless of whether the next branch instruction is taken or not taken.

6. The apparatus according to claim 1, in which the profiling circuitry is configured to setting the reference instruction address indicator to indicate an address of an instruction other than any of the following: an instruction at a branch target address of a most recent taken branch instruction prior to the given instruction; and an instruction address of a next taken branch instruction after the given instruction.

7. The apparatus according to claim 1, in which the profiling circuitry is configured to set, as the address to be indicated by the reference instruction address indicator for the given instruction, an address associated with a most recent instruction address reset event prior to the given instruction or a next instruction address reset event after the given instruction; and the profiling circuitry is configured to detect, as the reference instruction address reset event, processing of a taken branch operation.

8. The apparatus according to claim 7, wherein the profiling circuitry is also configured to detect, as the reference instruction address reset event, processing of a not-taken branch operation.

9. The apparatus according to claim 8, wherein the profiling circuitry is configured to determine, based on configuration information that is configurable by software or by an external device, whether the processing of the not-taken branch operation should be detected as the instruction address reset event.

10. The apparatus according to claim 7, in which the profiling circuitry is also configured to detect, as the reference instruction address reset event, one or more of: enabling of profiling by the profiling circuitry after profiling was previously disabled; taking an exception; returning from an exception; and processing of a sampled operation selected by the sampling circuitry.

11. The apparatus according to claim 7, in which when a reference instruction address invalidation event occurs between the most recent instruction address reset event and the given instruction or between the given instruction and the next instruction address reset event, the profiling circuitry is configured to omit the reference instruction address indicator from the sample record or indicate in the sample record that the reference instruction address indicator is invalid.

12. The apparatus according to claim 11, in which the reference instruction address invalidation event comprises one of: processing of a sampled operation selected by the sampling circuitry; enabling of profiling by the profiling circuitry after profiling was previously disabled; taking an exception; and returning from an exception.

13. The apparatus according to claim 1, in which the profiling circuitry is configured to including the reference instruction address indicator in the sample record captured for the sampled operation corresponding to the given instruction, at least when the given instruction is a taken or not-taken branch instruction.

14. The apparatus according to claim 1, in which the profiling circuitry is configured to omit the reference instruction address indicator from the sample record when profiling configuration information specifies that capture of the reference instruction address indicator is disabled.

15. The apparatus according to claim 1, in which the sample record comprises one or more packets; the profiling circuitry is configured to include the reference instruction address indicator in an address packet for specifying an address associated with the sampled operation, the address packet comprising a packet header specifying an address type indicator for identifying a type of address associated with the sampled operation; the address type indicator having a plurality of valid encodings, including: a reference instruction address encoding indicating that the address packet specifies the reference instruction address indicator; and at least one other encoding indicating that the address packet specifies an address other than the reference instruction address indicator.

16. The apparatus according to claim 1, comprising sample record writing circuitry configured to write the sample record captured by the profiling circuitry to memory.

17. The apparatus according to claim 16, in which the sample record writing circuitry is configured to write the sample record captured by the profiling circuitry to memory while the processing circuitry continues with uninterrupted processing.

18. The apparatus according to claim 16, comprising filtering circuitry configured to determine, based on whether the sampled operation satisfies at least one filter criterion, whether the sample record writing circuitry should write to memory the sample record captured by the profiling circuitry for the sampled operation.

19. The apparatus according to claim 1, in which the filtering circuitry is configured to specify, as one of the at least one filter criterion, a criterion that the sampled operation corresponding to the given sample record is a taken branch operation.

20. The apparatus according to claim 8, in which the filtering circuitry is configured to specify, as one of the at least one filter criterion, a criterion that the sampled operation corresponding to the given sample record is either a taken branch operation or a not-taken branch operation.

21. The apparatus according to claim 1, in which, when random perturbation of the sampling interval is enabled, the profiling circuitry is configured to apply a random or pseudorandom perturbation to the sampling interval counted by the interval counter.

22. The apparatus according to claim 1, in which the reference instruction address indicator specifies one of:
an absolute value of the address of the reference instruction; a relative offset of an address of one of the given instruction and the reference instruction relative to the address of the other of the given instruction and the reference instruction; and
a number of instructions between the given instruction and the reference instruction.

23. A method comprising:
performing data processing operations in response to instructions fetched from a cache or memory or micro-operations decoded from the instructions;
selecting a subset of instructions or micro-operations as sampled operations to be profiled, wherein a next sampled operation is selected in response to elapse of a sampling interval counted by an interval counter; and
capturing, in response to processing of an instruction or micro-operation selected as a sampled operation by the sampling circuitry, a sample record specifying an operation type of the sampled operation and information about behaviour of the sampled operation which is directly attributed to the sampled operation; in which:
the profiling circuitry is capable of including, in the sample record captured for a sampled operation corresponding to a given instruction, a reference instruction address indicator indicative of an address of a reference instruction appearing earlier or later in program order than the given instruction, for which control flow is sequential between any instructions occurring between the reference instruction and the given instruction in program order.

* * * * *